(12) United States Patent
Jung et al.

(10) Patent No.: US 11,281,035 B2
(45) Date of Patent: Mar. 22, 2022

(54) DISPLAY AND ELECTRONIC DEVICE INCLUDING THE SAME

(71) Applicant: Samsung Electronics Co., Ltd., Suwon-si (KR)

(72) Inventors: Songhee Jung, Suwon-si (KR); Silkyu Lim, Suwon-si (KR); Sungyoung Shin, Suwon-si (KR); Hyunchang Shin, Suwon-si (KR); Kwangtai Kim, Suwon-si (KR); Donghyun Yeom, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/856,234

(22) Filed: Apr. 23, 2020

(65) Prior Publication Data
US 2020/0341314 A1    Oct. 29, 2020

(30) Foreign Application Priority Data

Apr. 23, 2019 (KR) .................. 10-2019-0047591

(51) Int. Cl.
| | |
|---|---|
| G02F 1/133 | (2006.01) |
| G02F 1/1335 | (2006.01) |
| G02F 1/1362 | (2006.01) |
| G02F 1/1368 | (2006.01) |

(Continued)

(52) U.S. Cl.
CPC ........ *G02F 1/13318* (2013.01); *G02F 1/1339* (2013.01); *G02F 1/1368* (2013.01); *G02F 1/133514* (2013.01); *G02F 1/134309* (2013.01); *G02F 1/136286* (2013.01)

(58) Field of Classification Search
None
See application file for complete search history.

(56) References Cited

U.S. PATENT DOCUMENTS

| | | |
|---|---|---|
| 8,035,760 B2 | 10/2011 | Kim et al. |
| 8,125,580 B2 | 2/2012 | Takama et al. |
| 8,830,183 B2 | 9/2014 | Park et al. |

(Continued)

FOREIGN PATENT DOCUMENTS

| | | |
|---|---|---|
| CN | 108761885 A | 11/2018 |
| KR | 10-2009-0040611 A | 4/2009 |

(Continued)

OTHER PUBLICATIONS

English translation of WO-2020129343-A1, Title: Electronic Device With Integrated Camera and Display Device, Author: Tsunashima Takanori; Date of publication: Jun. 25, 2020 (Year: 2020).*

(Continued)

*Primary Examiner* — Shan Liu
(74) *Attorney, Agent, or Firm* — Jefferson IP Law, LLP

(57) ABSTRACT

An electronic device is provided. The electronic device includes a display including a sensor area in at least a part of the display, a sensor module disposed under the sensor area, and a processor operatively connected with the display and the sensor module. The display includes a screen area surrounding the sensor area. At least one pixel electrode included in the sensor area is disposed differently from pixel electrodes included in the screen area.

15 Claims, 30 Drawing Sheets

(51) Int. Cl.
*G02F 1/1339* (2006.01)
*G02F 1/1343* (2006.01)

(56) References Cited

U.S. PATENT DOCUMENTS

| | | |
|---|---|---|
| 9,143,668 B2 | 9/2015 | Mathew et al. |
| 10,009,525 B2 | 6/2018 | Mathew et al. |
| 10,019,940 B2 | 7/2018 | Rappoport et al. |
| 10,248,254 B1 | 4/2019 | Zhang et al. |
| 2005/0128413 A1* | 6/2005 | Son ................... G02F 1/134363 349/143 |
| 2010/0103364 A1* | 4/2010 | Choi ................... G02F 1/13394 349/157 |
| 2012/0268701 A1* | 10/2012 | Nemoto ................... G06F 3/042 349/106 |
| 2013/0135328 A1 | 5/2013 | Rappoport et al. |
| 2017/0153510 A1* | 6/2017 | Choi ................. G02F 1/133516 |
| 2017/0227804 A1* | 8/2017 | Nagasawa ............. G02F 1/1339 |
| 2018/0040301 A1* | 2/2018 | Bae ........................ G09G 5/006 |
| 2018/0315371 A1 | 11/2018 | Rappoport et al. |
| 2019/0130822 A1 | 5/2019 | Jung et al. |
| 2020/0103690 A1* | 4/2020 | Wu ....................... G06F 1/1686 |
| 2020/0110298 A1* | 4/2020 | Li ..................... G02F 1/133514 |
| 2020/0117034 A1* | 4/2020 | Yin ......................... H04M 1/02 |
| 2020/0236259 A1* | 7/2020 | Nakamura ......... G02F 1/133512 |
| 2020/0301188 A1* | 9/2020 | Araki ................ G02F 1/134309 |
| 2020/0310186 A1* | 10/2020 | Ina .................... G02F 1/133345 |
| 2020/0333650 A1* | 10/2020 | Ma ...................... G02F 1/13394 |

FOREIGN PATENT DOCUMENTS

| | | | |
|---|---|---|---|
| KR | 10-2009-0113795 A | 11/2009 | |
| KR | 10-1073194 B1 | 10/2011 | |
| KR | 10-2013-0027335 A | 3/2013 | |
| KR | 10-2017-0113066 A | 10/2017 | |
| WO | WO-2020062413 A1 * | 4/2020 | |
| WO | WO-2020129343 A1 * | 6/2020 | ............. G02F 1/133 |
| WO | WO-2020152963 A1 * | 7/2020 | ........... G02F 1/1333 |

OTHER PUBLICATIONS

English translation of WO-2020062413-A1, Title: Liquid Crystal Display Device Author: Zha Guowei; Liu Fancheng; Date of publication: Apr. 2, 2020 (Year: 2020).*

English translation of WO-2020152963-A1, Title: Display Device, and Electronic Apparatus Incorporating Display Device Therein, Author: Koito Takeo; Date of publication: Jul. 30, 2020 (Year: 2020).*

International Search Report dated Aug. 20, 2020, issued in International Patent Application No. PCT/KR2020/005393.

* cited by examiner

DISPLAY AND ELECTRONIC DEVICE INCLUDING THE SAME

CROSS-REFERENCE TO RELATED APPLICATION(S)

This application is based on and claims priority under 35 U.S.C. § 119(a) of a Korean patent application number 10-2019-0047591, filed on Apr. 23, 2019, in the Korean Intellectual Property Office, the disclosure of which is incorporated by reference herein in its entirety.

BACKGROUND

1. Field

The disclosure relates to a display and an electronic device including the same.

2. Description of Related Art

An electronic device, such as a smartphone, may include at least one display. The display is a data output device, and input data may be displayed on the display. In addition, as the display may include a touch sensitive panel, the display may operate as a touch screen. Such a display is typically mounted in the form of a large screen on a front surface of the electronic device.

In general, a display device may include a liquid crystal display (LCD) and a backlight unit. The liquid crystal display may have an active area provided at the center thereof and a bezel area provided at the outer edge thereof. The active area is a part on which a screen is actually displayed, and the bezel area prevents light from unnecessarily leaking at an outer portion of the display. The main reason that the bezel area is present is because of the structural design of the display device. The display device includes many parts other than a panel part viewed by a user, and the parts are disposed in the bezel area provided in the form of an edge at an outer portion of the display device. As the width of the bezel area is reduced, a user may more concentrate on a screen which is output. In particular, even if the user views an image through a smartphone, a screen looks full in a device having a thin bezel area, so the immersion level of the user is increased. Accordingly, a display device, a bezel area of which is not viewed by a user, has been developed.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a display, capable of controlling a display area (e.g., a sensor area) corresponding to a sensor module to be transparent or opaque based on an operation of the sensor module, when the sensor module is disposed under the display, and an electronic device including the same.

Additional aspects will be set forth in part in the description which follows and, in part, will be apparent from the description, or may be learned by practice of the presented embodiments.

In accordance with an aspect of the disclosure, an electronic device is provided. The electronic device includes a display including a sensor area in at least a part of the display, a sensor module disposed under the sensor area, and a processor operatively connected with the display and the sensor module. The display includes a screen area surrounding the sensor area. At least one pixel electrode included in the sensor area is disposed differently from pixel electrodes included in the screen area.

In accordance with another aspect of the disclosure, a display device is provided. The display device includes a liquid crystal panel, a data driver connected with the liquid crystal panel through data lines, a gate driver connected with the liquid crystal panel through gate lines, and a timing controller to control the liquid crystal panel by applying a data signal to the data driver and applying a gate signal to the gate driver. The liquid crystal panel includes a first area including a color filter and a second area from which the color filter is absent. The first area may surround the second area, and at least one pixel electrode included in the second area may be disposed differently from pixel electrodes included in the first area.

In accordance with another aspect of the disclosure, a display device is provided. The display device includes a liquid crystal panel, a data driver connected with the liquid crystal panel through data lines, a gate driver connected with the liquid crystal panel through gate lines, and a timing controller to control the liquid crystal panel by applying a data signal to the data driver and applying a gate signal to the gate driver. The liquid crystal panel may include a first area including a liquid crystal and at least one electrode to drive the liquid crystal, and a second area including the liquid crystal and a transparent support member from which the electrode is absent. The first area surrounds the second area.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
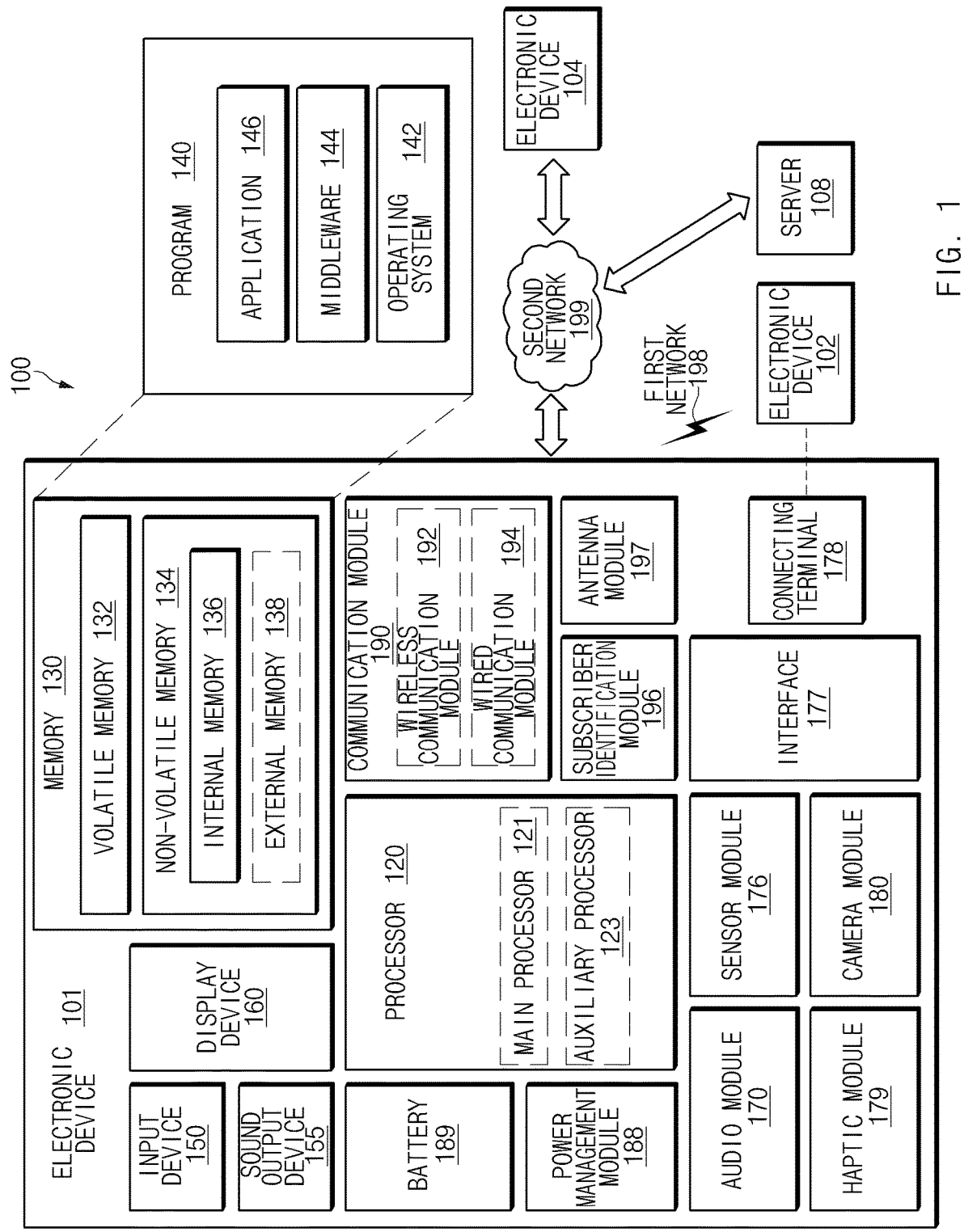
FIG. 1 is a block diagram illustrating an electronic device in a network environment according to an embodiment of the disclosure.

FIG. 1 is a block diagram illustrating an electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS)

communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., printed circuit board (PCB)). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
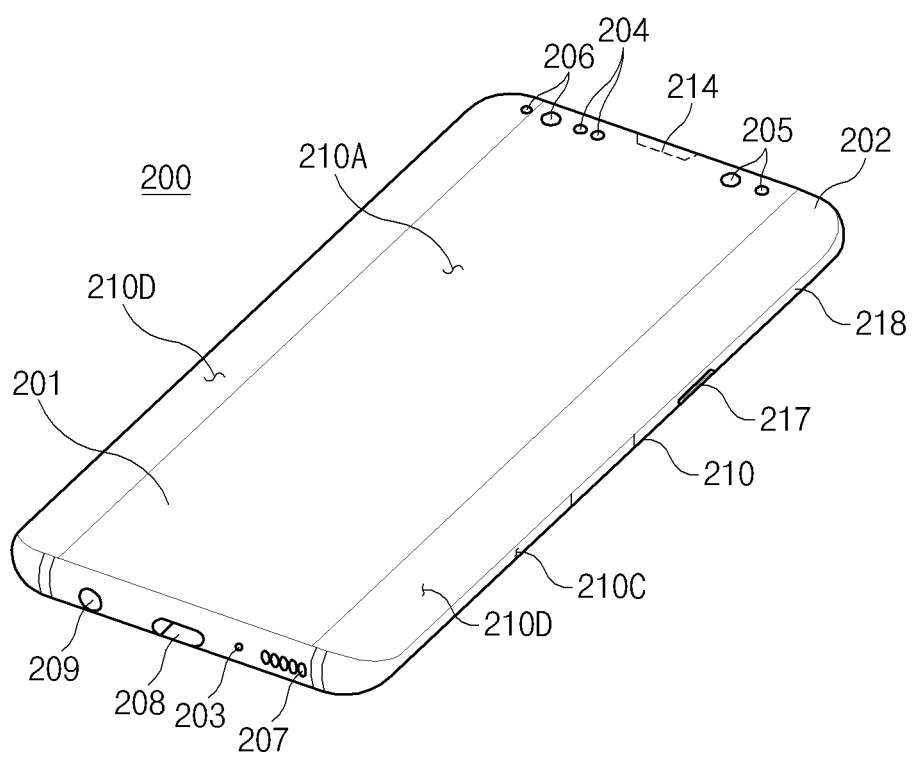
FIG. 2 is a perspective view illustrating a front surface of a mobile electronic device, according to an embodiment of the disclosure.

FIG. 2 is a perspective view illustrating a front surface of a mobile electronic device, according to an embodiment of the disclosure.

Figure 3:
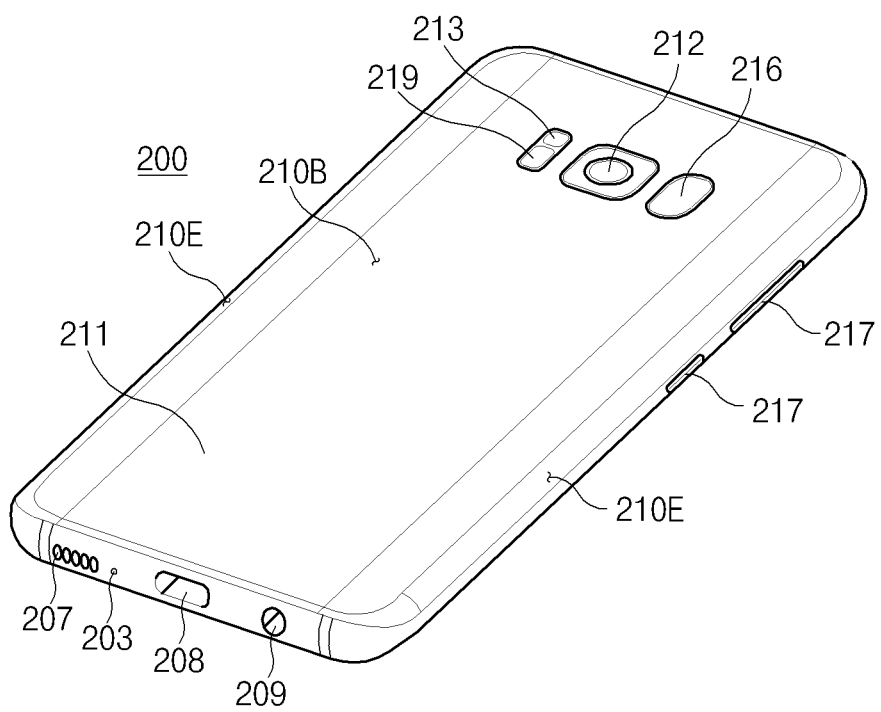
FIG. 3 is a perspective view illustrating a rear surface of an electronic device of FIG. 2 according to an embodiment of the disclosure.

FIG. 3 is a perspective view illustrating a rear surface of an electronic device of FIG. 2 according to an embodiment of the disclosure.

Figure 4:
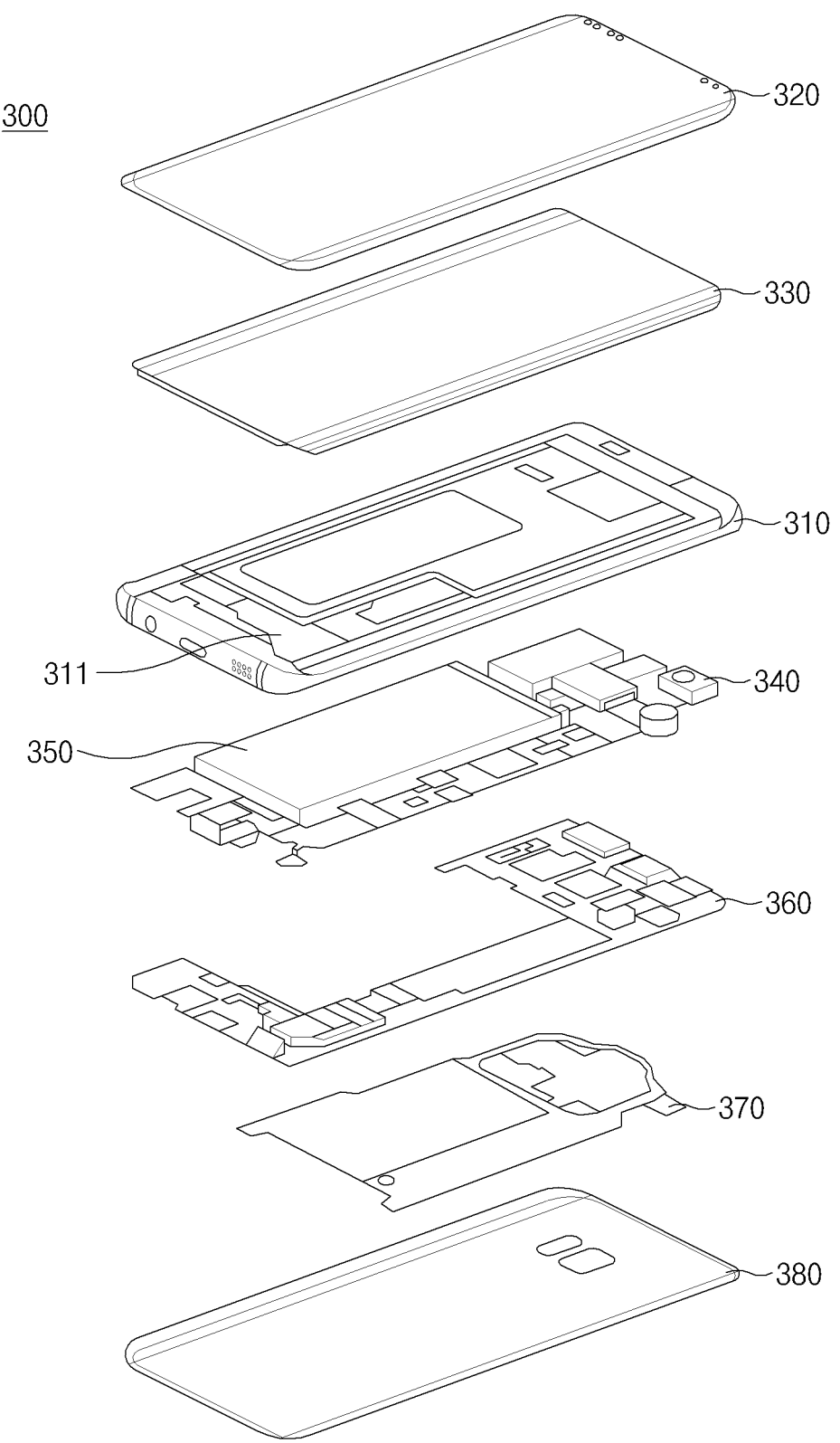
FIG. 4 is a developed perspective view of an electronic device of FIG. 2 according to an embodiment of the disclosure.

FIG. 4 is a developed perspective view of the electronic device of FIG. 2 according to an embodiment of the disclosure.

Referring to FIGS. 2 and 3, according to an embodiment, the electronic device 200 (e.g., the electronic device 101) may include a housing 210 including a first surface 210A (or front surface), a second surface 210B (or rear surface), and a side surface 210C surrounding the space between the first surface 210A and the second surface 210B. According to another embodiment (not illustrated), the housing 210 may be referred to as the structure forming some of the first surface 210A, the second surface 210B, and the side surface 210C of FIG. 2. According to an embodiment, the first surface 210A may include a front plate 202 (e.g., a glass plate or a polymer plate including various coating layers) having at least a portion substantially transparent. The second surface 210B may include a rear plate 211 substantially opaque. The rear plate 211 may include, for example, coated or colored glass, ceramic, polymer, metal (e.g., aluminum, stainless steel (STS), or magnesium) or the combination of the above materials. The side surface 210C may include a side bezel structure (or "side member") 218 which is coupled to the front plate 202 and the rear plate 211, and includes metal and/or polymer. According to an embodiment, the rear plate 211 and the side bezel structure 218 may be formed integrally with each other and may include the same material (e.g., a metal material such as aluminum).

According to an embodiment illustrated, the front plate 202 may include two first areas 210D bent toward the rear plate 211 from the first surface 210A while seamlessly extending and formed at opposite long edge ends of the front plate 202. According to an embodiment illustrated (see FIG. 3), the rear plate 211 may include two second areas 210E bent from the second surface 210B toward the front plate 202 while seamlessly extending and formed at opposite long edge ends of the rear plate 211. According to an embodiment, the front plate 202 (or the rear plate 211) may include only one of the first areas 210D (or the second areas 210E). According to another embodiment, some of the first areas 210D or the second areas 210E may not be included. According to the embodiments, when viewed from the side surface of the electronic device 200, the side bezel structure 218 may have a first thickness (or width) at the side surface having no first areas 210D or second areas 210E, and may have a second thickness thinner than the first thickness, at the side surface including the first areas 210D or the second areas 210E.

According to an embodiment, the electronic device 200 includes at least one a display 201, audio modules 203, 207 and 214, sensor modules 204, 216 and 219, camera modules 205, 212 and 213, a key input device 217, a light emitting device 206, or connector holes 208 and 209. According to an embodiment, the electronic device 200 may omit at least one (e.g., the key input device 217 or the light emitting device 206) of components or may include other components.

According to an embodiment, the display 201 may be exposed, for example, through a substantial portion of the front plate 202. According to an embodiment, at least a portion of the display 201 may be exposed through the front plate 202 including the first surface 210A and first areas 210D of the side surface 210C. According to an embodiment, the edge of the display 201 may be formed substantially identically to the shape of an adjacent outer shape of the front plate 202. According to another embodiment (not illustrated), to expand an area for exposing the display 201, the distance between an outer portion of the display 201 and an outer portion of the front plate 202 may be substantially uniformly formed.

According to an embodiment (not illustrate), at least one of the audio module 214, the sensor module 204, the camera module 205, the fingerprint sensor 216, or the light emitting device 206 may be included in a rear surface of the screen display area of the display 201. According to another embodiment (not illustrated), a recess or an opening is formed in a portion of a screen display area of the display 201. In addition, at least one of the audio module 214, the sensor module 204, the camera module 205, or the light emitting device 206 aligned in line with the recess or the opening may be included in the portion of the screen display area of the display 201. According to another embodiment (not illustrated), the display 201 may be coupled or disposed adjacent to a touch sensing circuit, a pressure sensor to measure the intensity (pressure) of a touch, and/or a digitizer to detect the stylus pen based on an electromagnetic scheme. According to an embodiment, at least some of the sensor module 204 or 219 and/or at least a portion of the key input device 217 may be disposed in the first areas 210D and/or the second areas 210E.

According to an embodiment, the audio modules 203, 207, and 214 may include a microphone hole 203 and speaker holes 207 and 214. The microphone hole 203 may have a microphone disposed inside the microphone hole 203 to obtain an external sound. In an embodiment, a plurality of microphones may be provided to sense the direction of a sound. The speaker holes 207 and 214 may include an external speaker hole 207 and a receiver hole 214 for conversation. In an embodiment, the speaker holes 207 and 214 and the microphone hole 203 may be implemented into one hole or a speaker may be included without the speaker holes 207 and 214 (e.g., a piezoelectric speaker).

According to an embodiment, the sensor modules 204, 216, and 219 may electrical signals or data values corresponding to an internal operating state or an external environment state of the electronic device 200. The sensor modules 204, 216 and 219 may, for example, include a first sensor module 204 (e.g., a proximity sensor) and/or a second sensor module 204 (e.g., a proximity sensor) disposed on the first surface 210A of the housing 210, and/or a third sensor module 219 (e.g., a heart rate monitor (HRM) sensor) and/or a fourth sensor module 216 (not illustrated) disposed on the second surface 210B of the housing 210. The fingerprint sensor may be disposed on the second surface 210B as well as the first surface 210A (e.g., the display 201) of the housing 210. The electronic device 200 may further include a sensor module (is not illustrated), for example, include at least one of a gesture sensor, a gyro sensor, an air pressure sensor, a magnetic sensor, an acceleration sensor, a grip sensor, a color sensor, an infrared sensor, a biometrics sensor, a temperature sensor, a humidity sensor, or an illuminance sensor 204.

According to an embodiment, the camera modules 205, 212 and 213 may include a first camera device 205 disposed on the first surface 210A of the electronic device 200 and a second camera module 212 and/or a flash 213 disposed on the second surface 210B of the electronic device 200. The camera devices 205 and 212 may include one or a plurality of lenses, an image sensor, and/or an image signal processor. The flash 213 may include, for example, a light emitting diode (LED) or a xenon lamp. According to an embodiment, two or more lenses (infrared camera, a wide angle lens, and a telephoto lens) and image sensors may be disposed on one surface of the electronic device 200.

According to an embodiment, the key input device 217 may be disposed on the side surface 210C of the housing 210. According to another embodiment, the electronic device 200 may not include some or an entire portion of the key input device 217 and the some or the entire portion of the key input device 217 not included may be implemented in another form such as a soft key on the display 201. According to another embodiment, the key input device 217 may include the sensor module 216 disposed on the second surface 210B of the housing 210.

According to an embodiment, the light emitting device 206 may be, for example, disposed on the first surface 210A of the housing 210. The light emitting device 206 may provide, for example, the state information of the electronic device 200 in an optical form. According to another embodiment, the light emitting device 206 may provide, for example, a light source operating together with the operation of the cameral module 205. The light emitting device 206 may include, for example, an LED, an IR LED, and a xenon lamp.

According to an embodiment, the connector holes 208 and 209 may include a first connector hole 208 to receive a connector (e.g., a USB connector) to transmit or receive power and/or data together with the external electronic device and a second connector hole (e.g., an ear-phone jack) 209 to receive a connector to transmit or receive an audio signal together with the external electronic device.

Referring to FIG. 4, an electronic device 300 (e.g., the electronic device 101 or the electronic device 200) may include a side bezel structure 310, a first support member 311 (e.g., a bracket), a front plate 320, a display 330, a printed circuit board 340, a battery 350, a second support member 360 (e.g., a rear case), an antenna 370, and a rear plate 380. According to an embodiment, the electronic device 300 may additionally include at least one (e.g., the first support member 311 or the second support member 360) of components At least one of components of the electronic device 300 may be identical to or similar to at least one of components of the electronic device 200 of FIG. 2 or FIG. 3, and the duplicated description thereof will be omitted.

According to an embodiment, the first support member 311 is disposed in the electronic device 101 to be coupled to the side bezel structure 310 or to be integrated with the side bezel structure 310. The first support member 311 may include, for example, a metal material and/or a non-metal material (e.g., polymer). The first support member 311 may have one surface coupled to the display 330 and an opposite surface coupled to the printed circuit board 340. A processor, a memory, and/or an interface may be mounted on the printed circuit board 340. The processor may include, for example, one or more of a central processing unit, an application processor, a graphic processing unit, an image signal processor, a sensor hub processor, or a communication processor.

According to an embodiment, the memory may include, for example, a volatile memory and/or a non-volatile memory.

According to an embodiment, the interface may include, for example, a high definition multimedia interface (HDMI), a universal serial bus (USB) interface, an SD card interface, and/or an audio interface. The interface may, for example, electrically or physically connect the electronic device 300 with the external electronic device and may include a USB connector, an SD card/MMC connector, or an audio connector.

According to an embodiment, the battery 350 may include a device to supply power to at least one component of the electronic device 300, for example, a non-rechargeable primary battery, or a rechargeable secondary battery, or a fuel cell. At least a portion of the battery 350 may be on the substantially same plane as a plane of the printed circuit board 340. The battery 350 may be disposed inside the electronic device 300 integrally with the electronic device 300, and may be disposed detachably from the electronic device 101.

According to an embodiment, the antenna 370 may be interposed between the rear plate 380 and the battery 350. The antenna 370 may include, for example, a near field communication (NFC) antenna, a wireless charging antenna, and/or a magnetic secure transmission (MST) antenna. The antenna 370 may make local area network communication with an external device or may wirelessly transmit or receive power necessary for charging. According to another embodiment, an antenna structure may be formed by a portion of the side bezel structure 310 and/or the first support member 311 or the combination of the side bezel structure 310 and the first support member 311.

Figure 5:
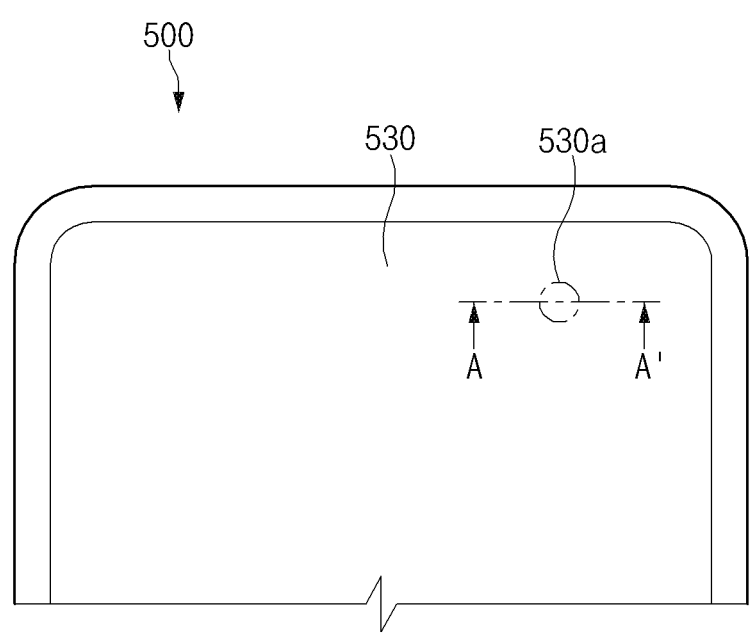
FIG. 5 is a view illustrating a portion of a display including a sensor area in an electronic device, according to an embodiment of the disclosure.

FIG. 5 is a view illustrating a portion of a display including a sensor area, in an electronic device, according to an embodiment of the disclosure.

Referring to FIG. 5, an electronic device 500 (e.g., the electronic device 300) may include a full cover display 530 (hereinafter, the display 530; e.g., the display 330). The display 530 may include a sensor area 530a formed on a back surface of the display 530, and at least one sensor module (e.g., the sensor module 204, the camera module 205, or the light emitting device 206) is disposed in the sensor area 530a. A stack structure of the display 530 in the sensor area 530a may be configured to be different from a stack structure of the display 530 in a part (hereinafter, a screen area) other than the sensor area 530a. The display 530 may perform an operation, which is different from an operation performed in the screen area, in the sensor area 530a. The display 530 may control the operation (e.g. a transparent state or an opaque state) of the sensor area 530a based on the operation of the sensor module.

According to an embodiment, the sensor area 530a may have various shapes. For example, in FIG. 5, although the sensor area 530a is marked in a circular shape, the shape of the sensor area 530a is not limited thereto. According to various embodiments, the sensor area 530a may be formed at an arbitrary position of the display 530. For example, the sensor area 530a may be disposed at an upper end, a lower end, or an outer portion of the display 530.

Figure 6A:
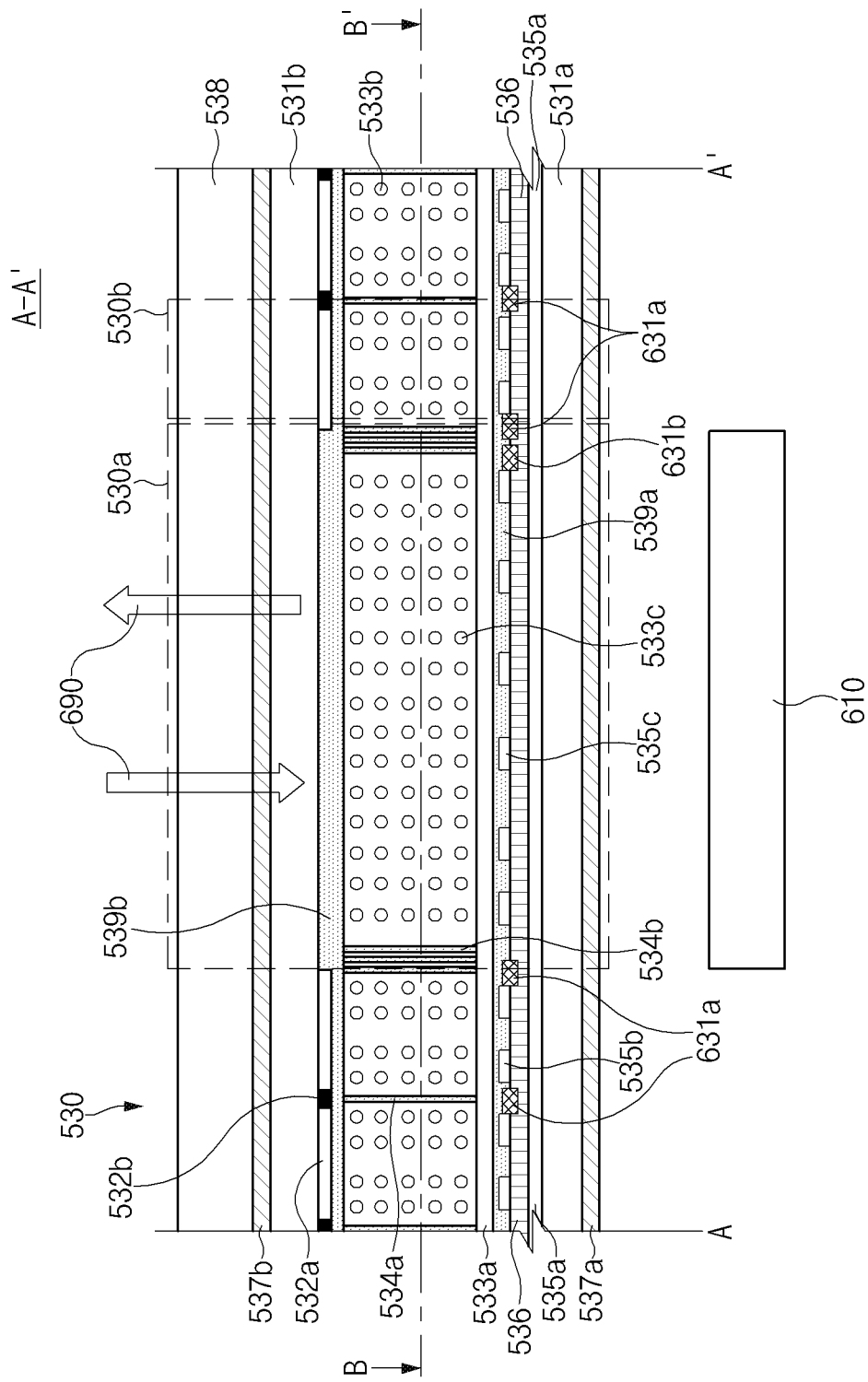
FIG. 6A illustrates a cross-section taken along line A-A' of FIG. 5 according to an embodiment of the disclosure.

FIG. 6A illustrates a cross-section taken along line A-A' of FIG. 5 according to an embodiment of the disclosure.

Figure 6B:
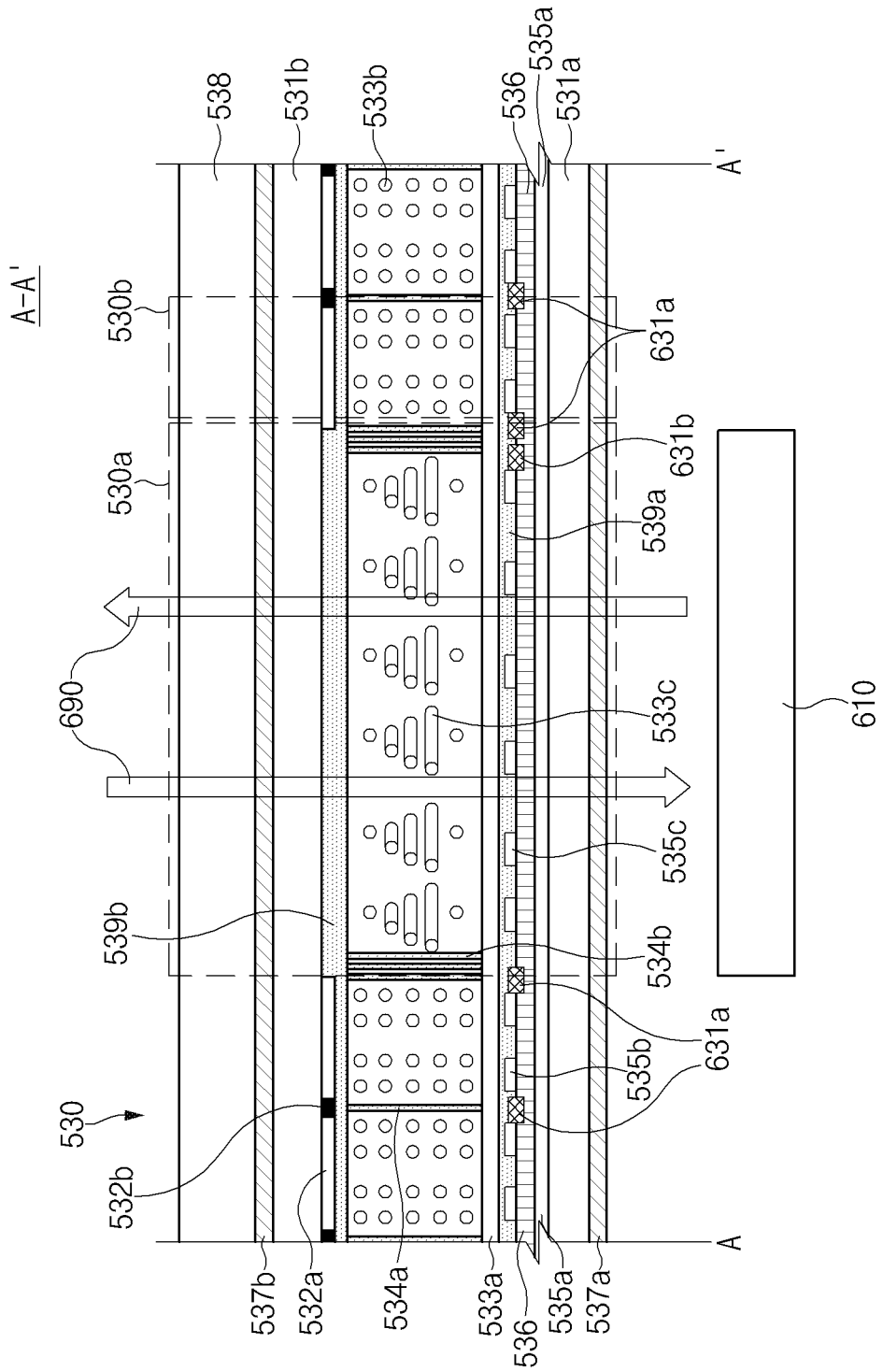
FIG. 6B is a view illustrating a transparent state of a sensor area in FIG. 6A according to an embodiment of the disclosure.

FIG. 6B is a view illustrating a transparent state of a sensor area of FIG. 6A according to an embodiment of the disclosure.

Referring to FIG. 6A, a sensor module 610 (e.g., the sensor module 204, the camera module 205, or the light emitting device 206) may be disposed on the back surface of the sensor area 530a of the display 530. According to an embodiment, the display 530 may include a stack structure of a plurality of layers formed based on a first substrate 531a (e.g., a lower substrate) and a second substrate 531b (e.g., an upper substrate).

According to an embodiment, the display 530 may be formed by combining a first part including the first substrate 531a with a second part including the second substrate 531b. For example, the first part may include a first polarizing plate 537a, a first substrate 531a, a first electrode 535a (e.g., a common electrode), an insulating layer 536, a second electrode 535b (e.g., a pixel electrode disposed in the screen area), a third electrode 535c (e.g., a pixel electrode disposed in the sensor area 530a), a first switching device 631a (e.g., a thin film transistor (TFT) corresponding to each pixel), a second switching device 631b (e.g., a thin film transistor disposed in the sensor area 530a), and a liquid crystal alignment layer 533a. The first polarizing plate 537a may be stacked under the first substrate 531a. The first electrode 535a may be formed on the first substrate 531a. The insulating layer 536 may be formed on the first electrode 535a. The first switching device 631a and the second switching device 631b may be formed on the insulating layer 536. The second electrode 535b and the third electrode 535c may be formed on the insulating layer 536. The first adhesive member 539a (e.g., optical clear resin (OCR)) may be disposed on the second electrode 535b. The liquid crystal alignment layer 533a may be stacked on the second electrode 535b. The liquid crystal alignment layer 533a may be coupled onto the second electrode 535b through the first adhesive member 539a. The first polarizing plate 537a, the first substrate 531a, the first electrode 535a, the insulating layer 536, the second electrode 535b, the third electrode 535c, the first adhesive member 539a, and the liquid crystal alignment layer 533a may be formed of a transparent material.

According to an embodiment, the second part may include a color filter 532a (e.g., a red, green, and blue (RGB) filter), an opaque member 532b (e.g., a black matrix (BM) or printed BM), the second substrate 531b, a second polarizing plate 537b, and a window glass 538. For example, the color filter 532a and the BM (e.g., opaque member 532b) may be stacked each other under the second substrate 531b. The second polarizing plate 537b may be stacked on the second substrate 531b. The window glass 538 may be stacked on the second polarizing plate 537b. The color filter 532a, the second substrate 531b, the second polarizing plate 537b, and the window glass 538 may be formed of a transparent material.

According to an embodiment, a first liquid crystal 533b (e.g., a liquid crystal disposed in the screen area) and a second liquid crystal 533c (e.g., a liquid crystal disposed in the sensor area 530a) may be interposed between the first part and the second part. For example, the first liquid crystal 533b and the second liquid crystal 533c may be formed on the liquid crystal alignment layer 533a. The liquid crystal alignment layer 533a may include alignment lines formed in a specific orientation. The first liquid crystal 533b and the second liquid crystal 533c may be formed to be aligned in the specific orientation (or in a uniform orientation) along the alignment lines. According to various embodiments, at least one first support member 534a and at least one second support member 534b (e.g., a spacer) may be interposed between the first part and the second part. The first support member 534a and the second support member 534b may ensure a space, which is to be filled with the first liquid crystal 533b and the second liquid crystal 533c, between the first part and the second part.

According to an embodiment, a light transmission state of one pixel 530b in the screen area may be gradually set under the control of a control circuit (e.g., the processor 120). For example, the potential difference, which corresponds to the pixel 530b, between the first electrode 535a and the second electrode 535b is determined depending on an object (e.g., a figure, a character, or an image) displayed on the display 530, the first liquid crystal 533b corresponding to the pixel 530b may rotate at an angle corresponding to the potential difference, and the light transmittance of the pixel 530b may be gradually determined. Accordingly, a light from an internal light source (e.g., a backlight unit not illustrated) of the electronic device (e.g., the electronic device 500) may be transmitted through the pixel 530b, and may be displayed in specific color having a specific brightness on the outside of the electronic device 500 after passing through a color filter 532a.

According to an embodiment, the color filter 532a may be removed from the sensor area 530a. Therefore, a light transmittance of the sensor area 530a may be more improved than a light transmittance of the screen area. In the display 530, the sensor area 530a may be formed at a position corresponding to a position of the sensor module 610. In the display 530, the light source may not be disposed on the back surface of the sensor area 530a. According to another embodiment, a portion of the sensor area 530a may include the color filter 532a. For example, when the sensor module 610 is not used, the electronic device may display the sensor area 530a in color identical to or similar to color of a surrounding screen area.

FIG. 6A illustrates an opaque state of the sensor area 530a, according to an embodiment. For example, when the sensor module 610 is in an inactive state, the sensor area 530a may be operated in the opaque state. In FIG. 6A, the potential difference, which corresponds to the sensor area 530a, between the first electrode 535a and the third electrode 535c has a first voltage (e.g., an opaque state voltage), and the entire portion of the second liquid crystal 533c may be aligned in the same orientation. When the entire portion of the second liquid crystal 533c is aligned in the same orientation, the sensor area 530a may be in the opaque state. In this case, an external light 690 may be blocked by the second liquid crystal 533c without reaching the sensor module 610. When viewed from the outside of the electronic device, the sensor area 530a is displayed in dark, and the sensor module 610 is prevented from being observed from the outside, thereby improving the aesthetics of the electronic device.

According to various embodiments, the number of third electrodes 535c, which are disposed in the sensor area 530a, per unit area may be smaller than the number of second electrodes 535b, which are disposed in the screen area, per unit area. According to various embodiments, one third electrode 535c may be disposed in the sensor area 530a.

According to an embodiment, the second liquid crystal 533c in the sensor area 530a may be controlled depending on an application, a sensor, or position information inside the electronic device. For example, when a user executes a camera application, the electronic device may control the second liquid crystal 533c to easily obtain an external light in the sensor area 530a through the sensor module 610. The electronic device may change the sensor area 530a to be opaque by controlling the second liquid crystal 533c, when the user powers off the electronic device. The electronic device may obtain an external illuminance value using at least one sensor and may adjust transparency or opacity of the sensor area 530a based on the external illuminance.

FIG. 6B illustrates the transparent state of the sensor area 530a, according to an embodiment. For example, when the sensor module 610 is in an active state, the sensor area 530a may operate in a transparent state. In FIG. 6A, the potential difference, which corresponds to the sensor area 530a, between the first electrode 535a and the third electrode 535c may have a second voltage (e.g., a transparent state voltage), and the second liquid crystal 533c may be aligned by partially rotating in a specified orientation. When the second liquid crystal 533c is aligned by partially rotating in the specified orientation, the sensor area 530a may be in the transparent state. In this case, the external light 690 may reach the sensor module 610 through the display 530. The color filter 532a and an obstacle (e.g., a spacer or a sealant) are absent in the sensor area 530a. Accordingly, the transmittance of the sensor area 530a may be more improved than the transmittance of the sensor area when the color filter 532a or the obstacle is present.

According to an embodiment, at least one second support member 534b may be disposed at a boundary portion between the sensor area 530a and the screen area to prevent the transmission of the external light 690 from being interrupted. For example, second support members 534b may be densely disposed at a short distance (e.g., a distance smaller than an arrangement distance between the first support members 534a in the screen area) at the boundary part between the sensor area 530a and the screen area. According to various embodiments, an opaque member (e.g., the opaque member 532b, a BM, or a printed BM) may be disposed over the second support member 534b similarly to the first support member 534a. According to various embodiments, a coating (e.g., an anti-reflection (AR) coating) may be formed over or under the first substrate 531a or the second substrate 531b to reduce the reflection of the light.

Figure 6C:
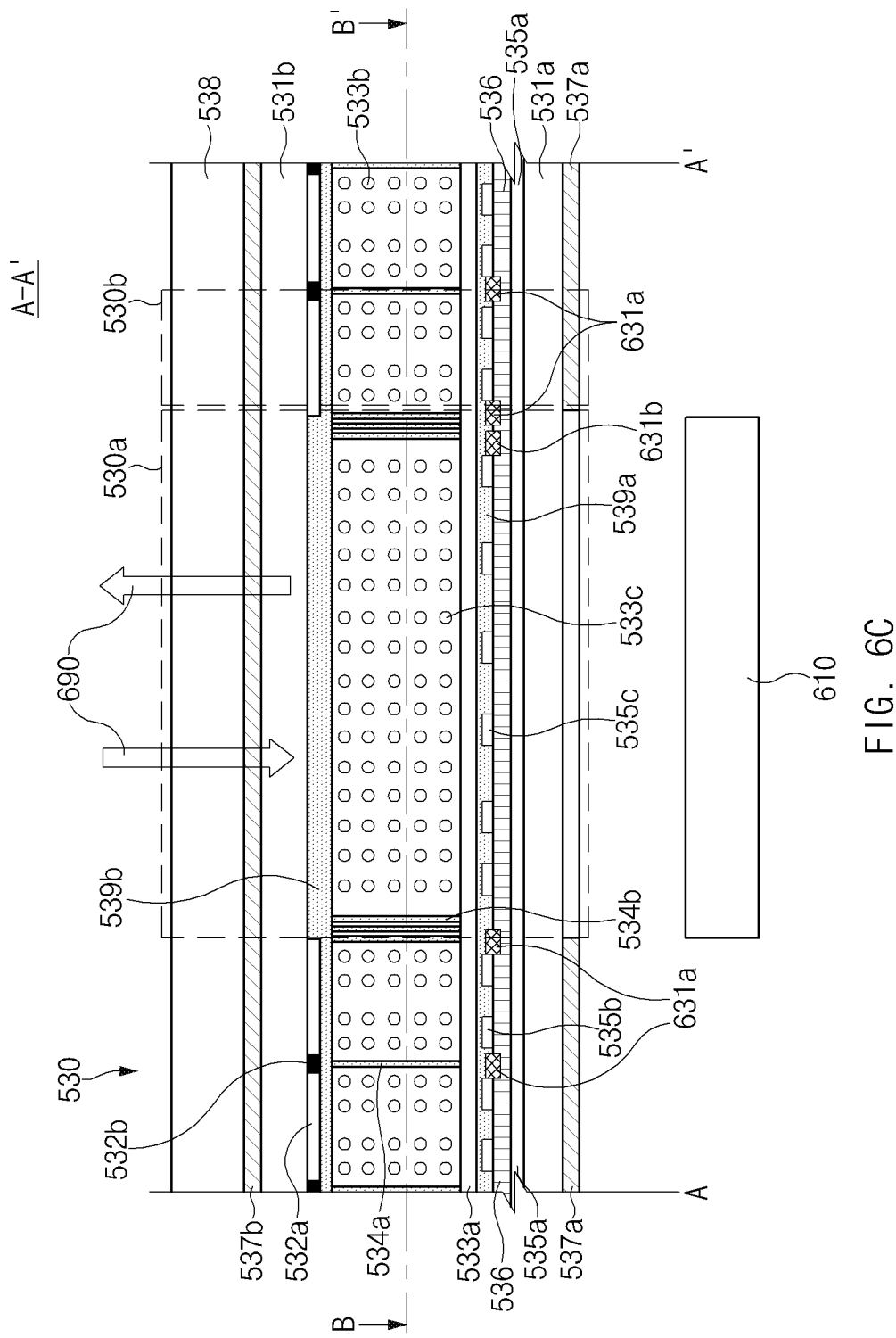
FIG. 6C illustrates another cross-section taken along line A-A' of FIG. 5 according to an embodiment of the disclosure.

FIG. 6C illustrates another cross-section taken along line A-A' of FIG. 5 according to an embodiment of the disclosure.

At least some of components of the display 530 of FIG. 6C may be identical to or similar to at least some of components of the display 530 of FIG. 6A. Accordingly, the description of components identical to or similar to the components of FIG. 6A may be omitted below.

According to an embodiment, the first polarizing plate 537a may be removed from the sensor area 530a. Accordingly, when the second liquid crystal 533c is in the transparent state, the external light 690 may be transmitted more excellently as compared with the case of FIG. 6A.

Figure 6D:
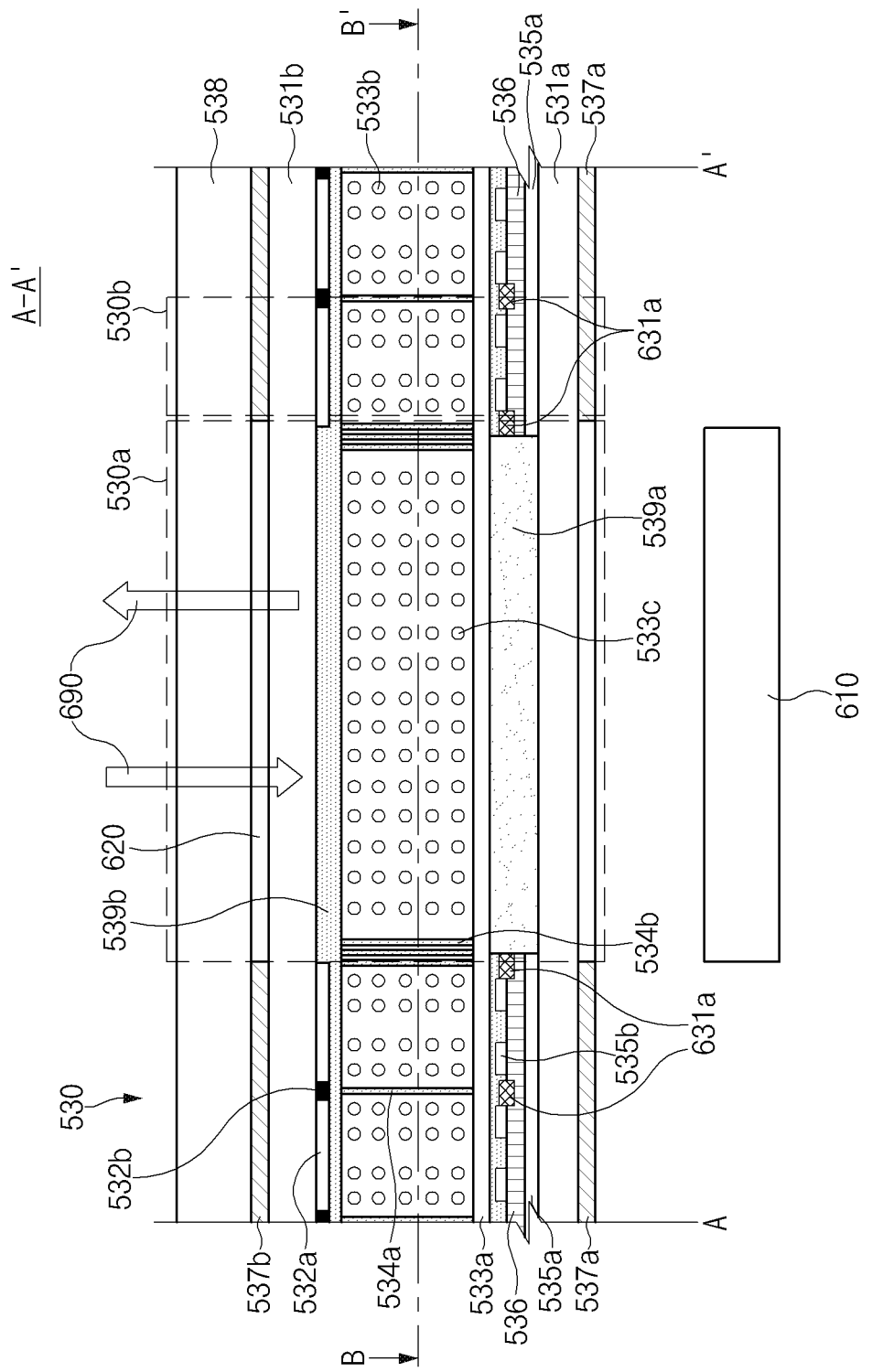
FIG. 6D illustrates another cross-section taken along line A-A' of FIG. 5 according to an embodiment of the disclosure.

FIG. 6D illustrates another cross-section taken along line A-A' of FIG. 5 according to an embodiment of the disclosure.

At least some of components of the display 530 of FIG. 6D may be identical to or similar to at least some of components of the display 530 of FIG. 6C. Accordingly, the description of components identical to or similar to the components of FIG. 6C may be omitted below.

According to an embodiment, the first polarizing plate 537a and the second polarizing plate 537b may be removed from the sensor area 530a. In addition, the first electrode 535a, the third electrode 535c, and the insulating layer 536 may be removed from the sensor area 530a. Accordingly, when the second liquid crystal 533c is in the transparent state, the external light 690 may be transmitted more excellently as compared with the case of FIG. 6C. According to various embodiments, the second liquid crystal 533c may be aligned to be maintained in the transparent state.

According to various embodiments, a part having no the second polarizing plate 537b may be filled with a transparent adhesive member 620 (e.g., pressure sensitive adhesive (PSA)). A part having no first electrode 535a, third electrode 535c, and insulating layer 536 may be filled with the first adhesive member 539a.

Figure 6E:
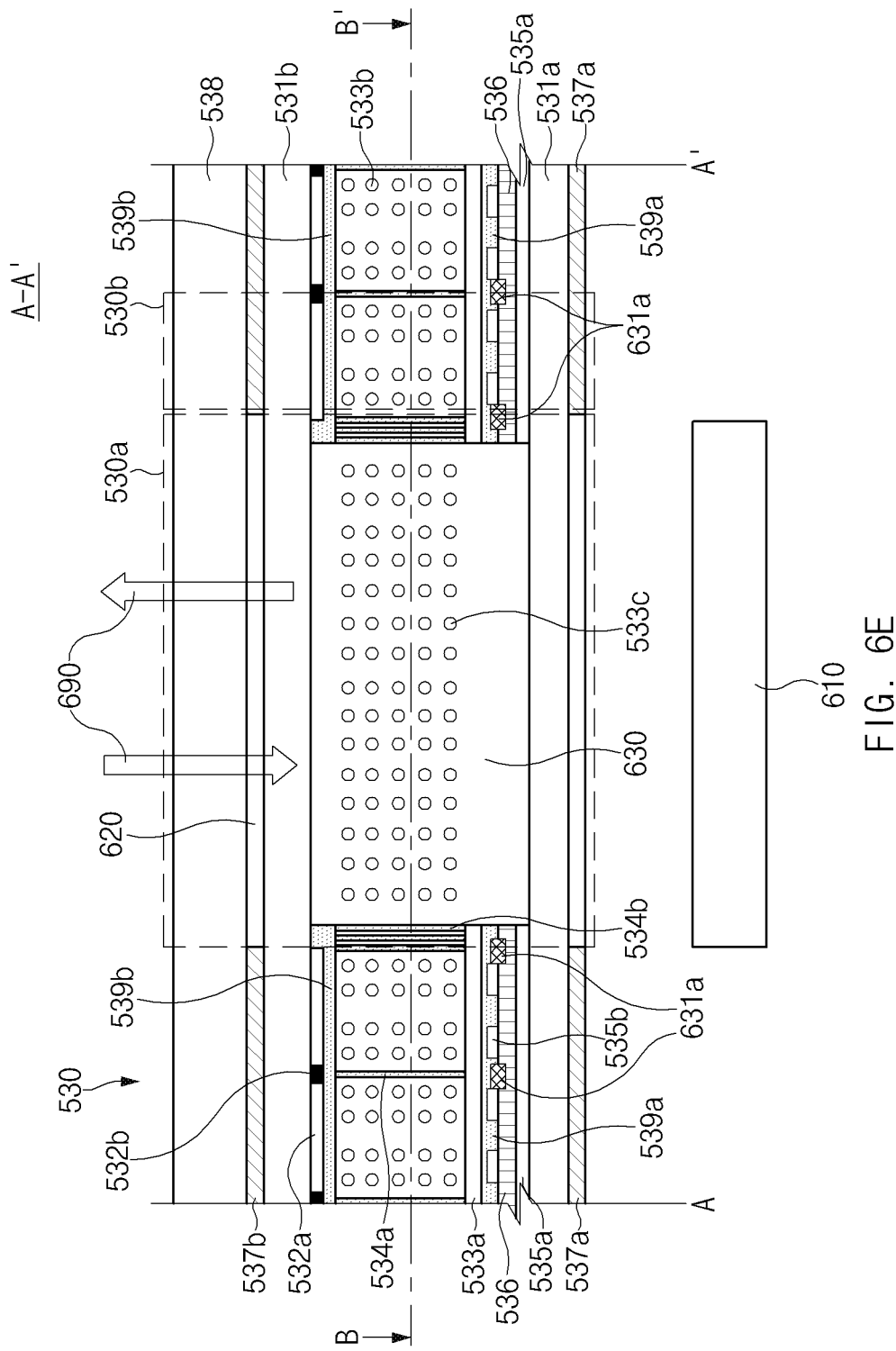
FIG. 6E illustrates another cross-section taken along line A-A' of FIG. 5 according to an embodiment of the disclosure.

FIG. 6E illustrates another cross-section taken along line A-A' of FIG. 5 according to an embodiment of the disclosure.

At least some of components of the display 530 of FIG. 6E may be identical to or similar to at least some of components of the display 530 of FIG. 6D. Accordingly, the description of components identical to or similar to the components of FIG. 6D may be omitted below.

According to an embodiment, the first polarizing plate 537a and the second polarizing plate 537b may be removed from the sensor area 530a. In addition, the first electrode 535a, the third electrode 535c, and the insulating layer 536 may be removed from the sensor area 530a. In addition, the liquid crystal alignment layer 533a, the first adhesive member 539a, and the second adhesive member 539b may be removed from the sensor area 530a. Accordingly, when the second liquid crystal 533c is in the transparent state, the external light 690 may be transmitted more excellently as compared with the case of FIG. 6D. According to various embodiments, the second liquid crystal 533c may be aligned to be maintained in the transparent state.

According to various embodiments, a part having no second polarizing plate 537b may be filled with a transparent adhesive member 620 (e.g., PSA). A part having no first electrode 535a, third electrode 535c, insulating layer 536, liquid crystal alignment layer 533a, first adhesive member 539a, and second adhesive member 539b may be filled with a planarization layer 630 (e.g., the transparent insulating layer; PSA). According to another embodiment, a part having no first electrode 535a, third electrode 535c, insulating layer 536, liquid crystal alignment layer 533a, first adhesive member 539a, and second adhesive member 539b may be filled with the second liquid crystal 533c.

Figure 6F:
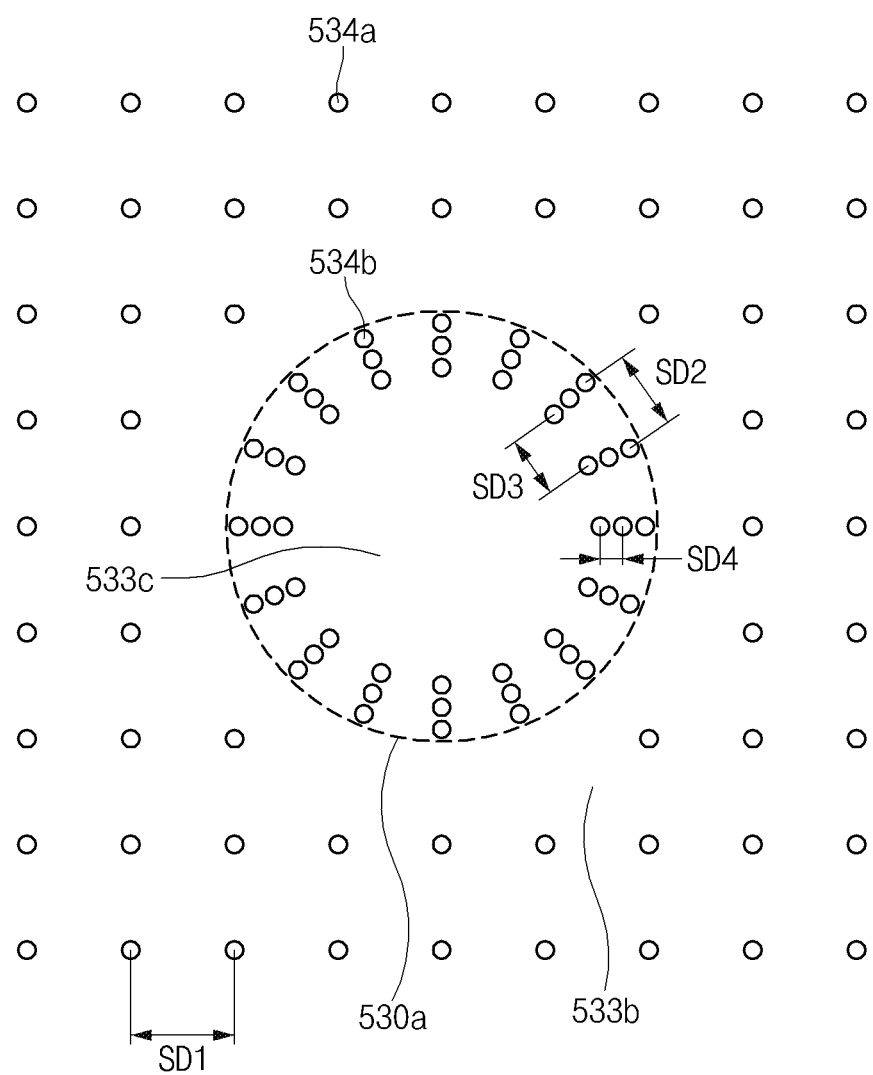
FIG. 6F is a view illustrating an arrangement structure of a support member taken along line B-B' in FIG. 6A (or FIG. 6C, 6D, or 6E) according to an embodiment of the disclosure.

FIG. 6F is a view illustrating an arrangement structure of a support member taken along line B-B' in FIG. 6A (or FIG. 6C, 6D, or 6E) according to an embodiment of the disclosure.

Referring to FIGS. 6A and 6F, the first liquid crystal 533b and the second liquid crystal 533c may be injected into a space supported by the first support member 534a or the second support member 534b.

According to an embodiment, FIG. 6F illustrates the alignment shapes of the first support member 534a and the second support member 534b. For example, first support members 534a may be arranged at a specific first distance SD1 in a screen area other than the sensor area 530a. The first distance SD1 may have a size corresponding to a size of a pixel 530b of the display 530. In the sensor area 530a, the second support members 534b may be arranged at distances (e.g., the second distance SD2, the third distance SD3, or the fourth distance SD4) smaller than the first distance SD1. The second support member 534b may be disposed at the boundary portion between the sensor area 530a and the screen area. The second support member 534b is disposed at the boundary portion between the sensor area 530a and the screen area, so the transmittance of the external light 690 to the sensor area 530a may be more improved than a light transmittance in the screen area. For example, the second support member 534b may be disposed radially from the center of the sensor area 530a. However, the arrangement shape of the second support member 534b is not limited thereto.

Figure 7A:
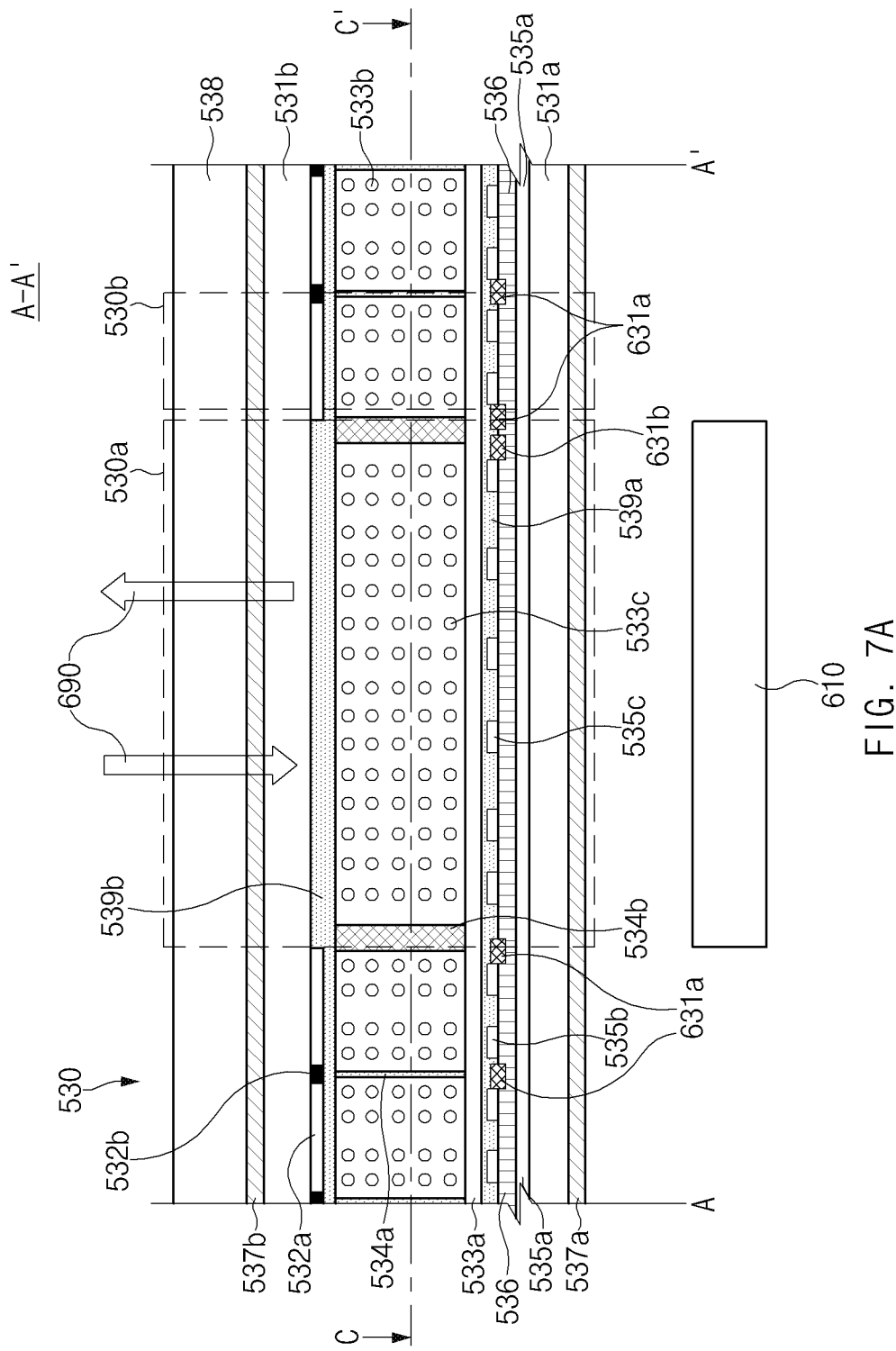
FIG. 7A illustrates a cross-section taken along line A-A' of FIG. 5, according to an embodiment of the disclosure.

FIG. 7A illustrates a cross-section taken along line A-A' of FIG. 5, according to an embodiment of the disclosure.

At least some of components of the display 530 of FIG. 7A may be identical to or similar to at least some of components of the display 530 of FIG. 6A. Accordingly, the description of components identical to or similar to the components of FIG. 6A may be omitted below.

According to an embodiment, a third support member 534c (e.g., a sealant) may be disposed between the boundary portion between the sensor area 530a and the screen area. For example, the third support member 534c may be formed with a thickness thicker than a thickness of the second support member 534b of FIG. 6A. The third support member 534c may be formed of a transparent material.

According to various embodiments, the number of third electrodes 535c per unit area in the sensor area 530a may be smaller than the number of second electrodes 535b per unit area in the screen area. According to various embodiments, one third electrode 535c may be disposed in the sensor area 530a.

Figure 7B:
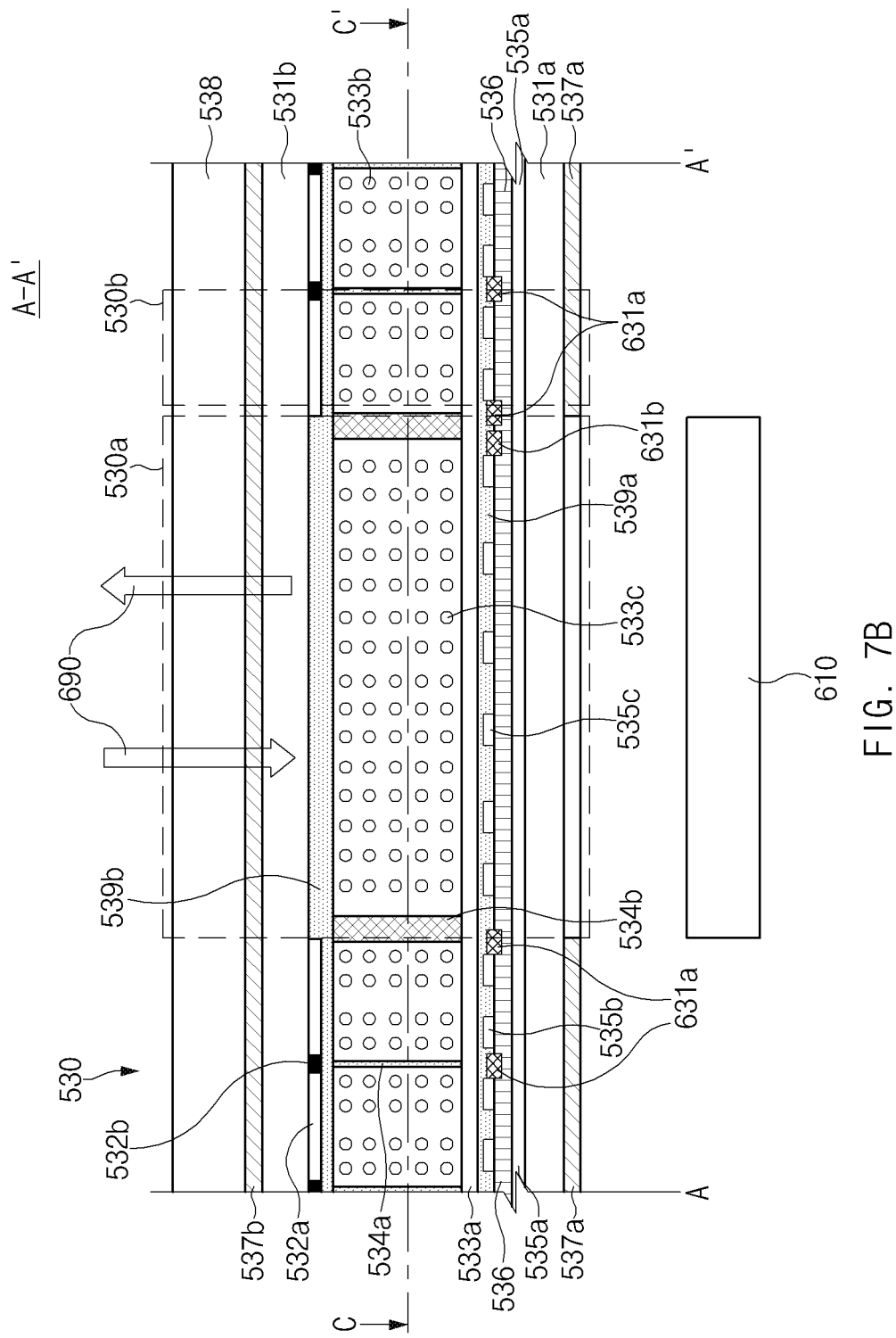
FIG. 7B illustrates another cross-section taken along line A-A' of FIG. 5 according to an embodiment of the disclosure.

FIG. 7B illustrates another cross-section taken along line A-A' of FIG. 5 according to an embodiment of the disclosure.

At least some of components of the display 530 of FIG. 7B may be identical to or similar to at least some of components of the display 530 of FIG. 7A. Accordingly, the description of components identical to or similar to the components of FIG. 7A may be omitted below.

According to an embodiment, the first polarizing plate 537a may be removed from the sensor area 530a. Accordingly, when the second liquid crystal 533c is in the transparent state, the external light 690 may be transmitted more excellently as compared with the case of FIG. 7A.

Figure 7C:
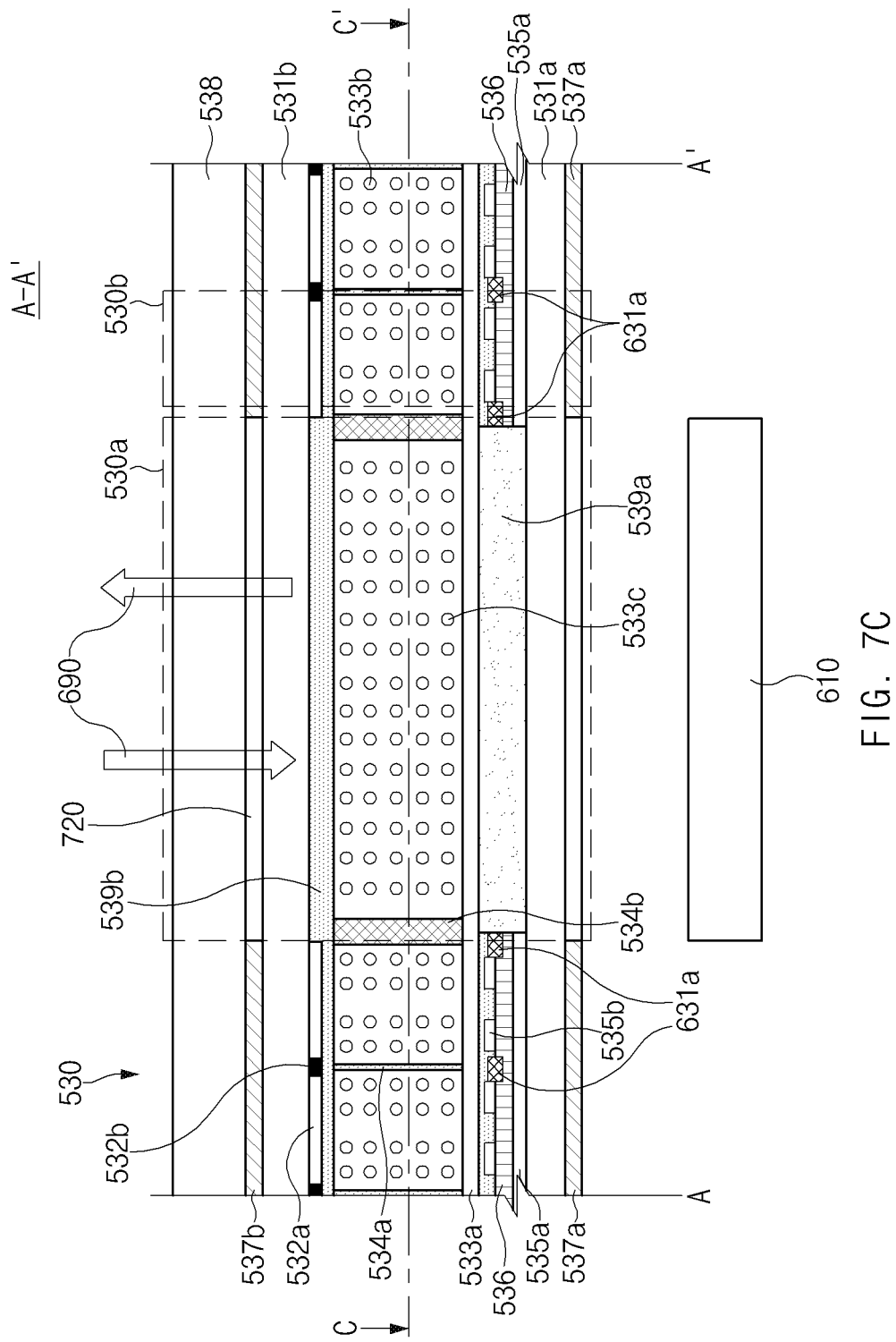
FIG. 7C illustrates another cross-section taken along line A-A' of FIG. 5 according to an embodiment of the disclosure.

FIG. 7C illustrates another cross-section taken along line A-A' of FIG. 5 according to an embodiment of the disclosure.

At least some of components of the display 530 of FIG. 7C may be identical to or similar to at least some of components of the display 530 of FIG. 7B. Accordingly, the description of components identical to or similar to the components of FIG. 7B may be omitted below.

According to an embodiment, the first polarizing plate 537a and the second polarizing plate 537b may be removed from the sensor area 530a. In addition, the first electrode 535a, the third electrode 535c, and the insulating layer 536 may be removed from the sensor area 530a. Accordingly, when the second liquid crystal 533c is in the transparent state, the external light 690 may be transmitted more excellently as compared with the case of FIG. 7B. According to various embodiments, the second liquid crystal 533c may be aligned to be maintained in the transparent state.

According to various embodiments, a part having no second polarizing plate 537b may be filled with a transparent adhesive member 720 (e.g., PSA). A part having no first electrode 535a, third electrode 535c, and insulating layer 536 may be filled with the first adhesive member 539a.

Figure 7D:
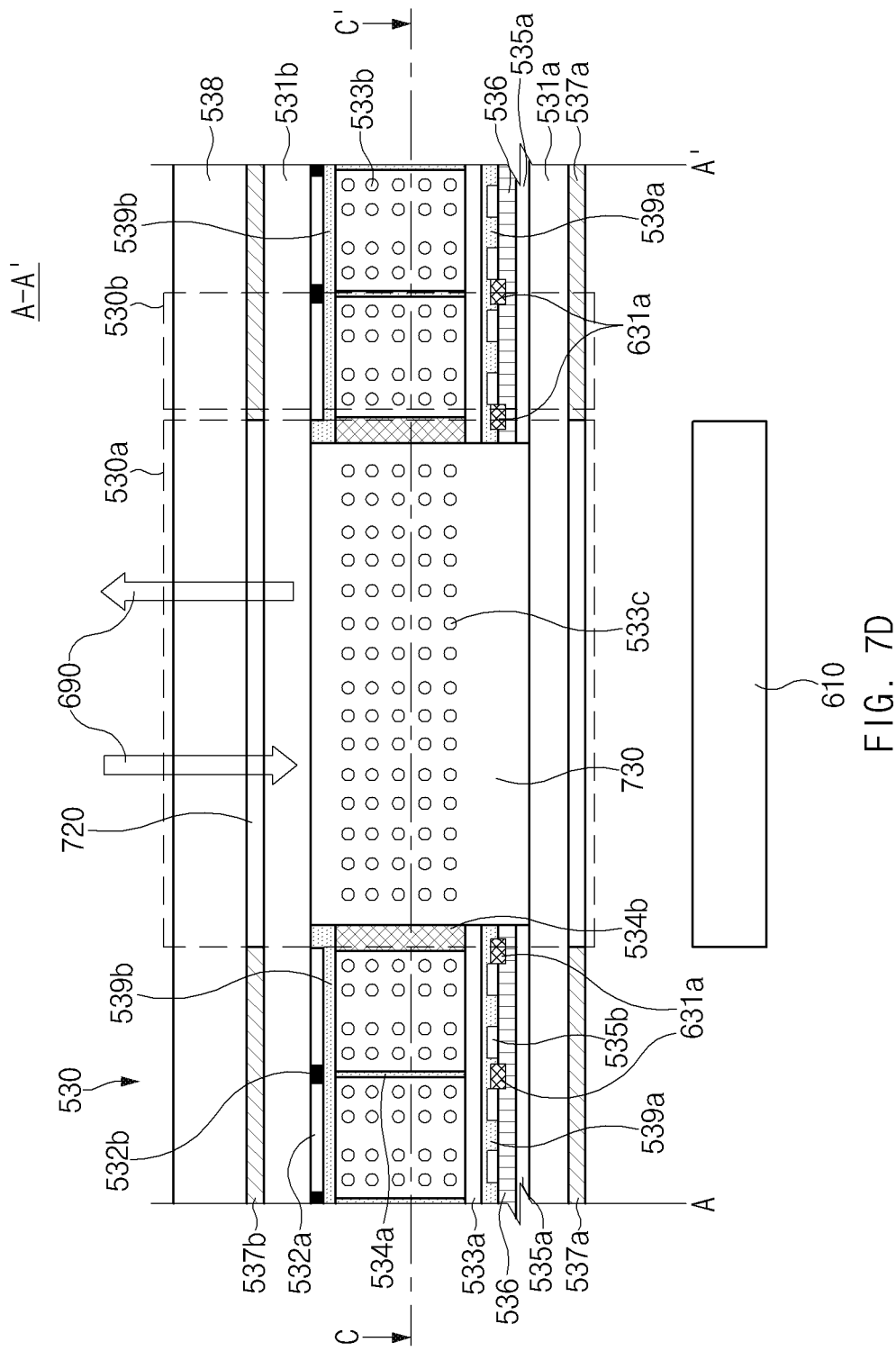
FIG. 7D illustrates another cross-section taken along line A-A' of FIG. 5 according to an embodiment of the disclosure.

FIG. 7D illustrates another cross-section taken along line A-A' of FIG. 5 according to an embodiment of the disclosure.

At least some of components of the display 530 of FIG. 7D may be identical to or similar to at least some of components of the display 530 of FIG. 7C. Accordingly, the description of components identical to or similar to the components of FIG. 7C may be omitted below.

According to an embodiment, the first polarizing plate 537a and the second polarizing plate 537b may be removed from the sensor area 530a. In addition, the first electrode 535a, the third electrode 535c, and the insulating layer 536 may be removed from the sensor area 530a. In addition, the liquid crystal alignment layer 533a, the first adhesive member 539a, and the second adhesive member 539b may be removed from the sensor area 530a. Accordingly, when the second liquid crystal 533c is in the transparent state, the external light 690 may be transmitted more excellently as compared with the case of FIG. 7C. According to various embodiments, the second liquid crystal 533c may be aligned to be maintained in the transparent state.

According to various embodiments, a part having no the second polarizing plate 537b may be filled with a transparent adhesive member 620 (e.g., PSA). A part having no first electrode 535a, third electrode 535c, insulating layer 536, liquid crystal alignment layer 533a, first adhesive member 539a, and second adhesive member 539b may be filled with a planarization layer 730 (e.g., the transparent insulating layer; PSA). According to another embodiment, a part having no first electrode 535a, third electrode 535c, insulating layer 536, liquid crystal alignment layer 533a, first adhesive member 539a, and second adhesive member 539b may be filled with the second liquid crystal 533c.

Figure 7E:
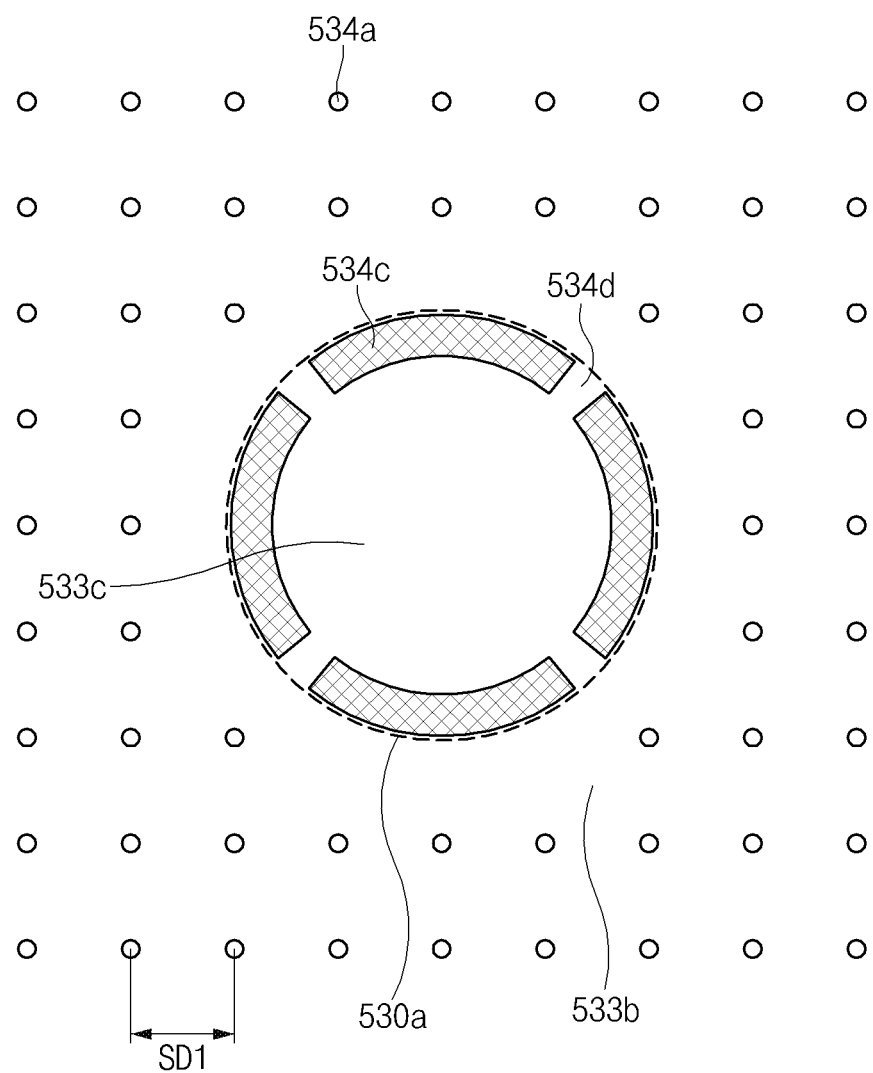
FIG. 7E is a view illustrating an arrangement structure of a support member taken along line C-C' in FIG. 7A (or FIG. 7B, 7C, or 7D) according to an embodiment of the disclosure.

FIG. 7E is a view illustrating an arrangement structure of a support member taken along line C-C' in FIG. 7A (or FIG. 7B, 7C, or 7D) according to an embodiment of the disclosure.

Referring to FIGS. 7A and 7E, the third support member 534c are divided into a plurality of parts along the boundary portion between the sensor area 530a and the screen area. For example, at least one gap 534d may be formed between the plurality of parts of the third support member 534c. The second liquid crystal 533c may be injected even into the sensor area 530a through the gap 534d.

Figure 8:
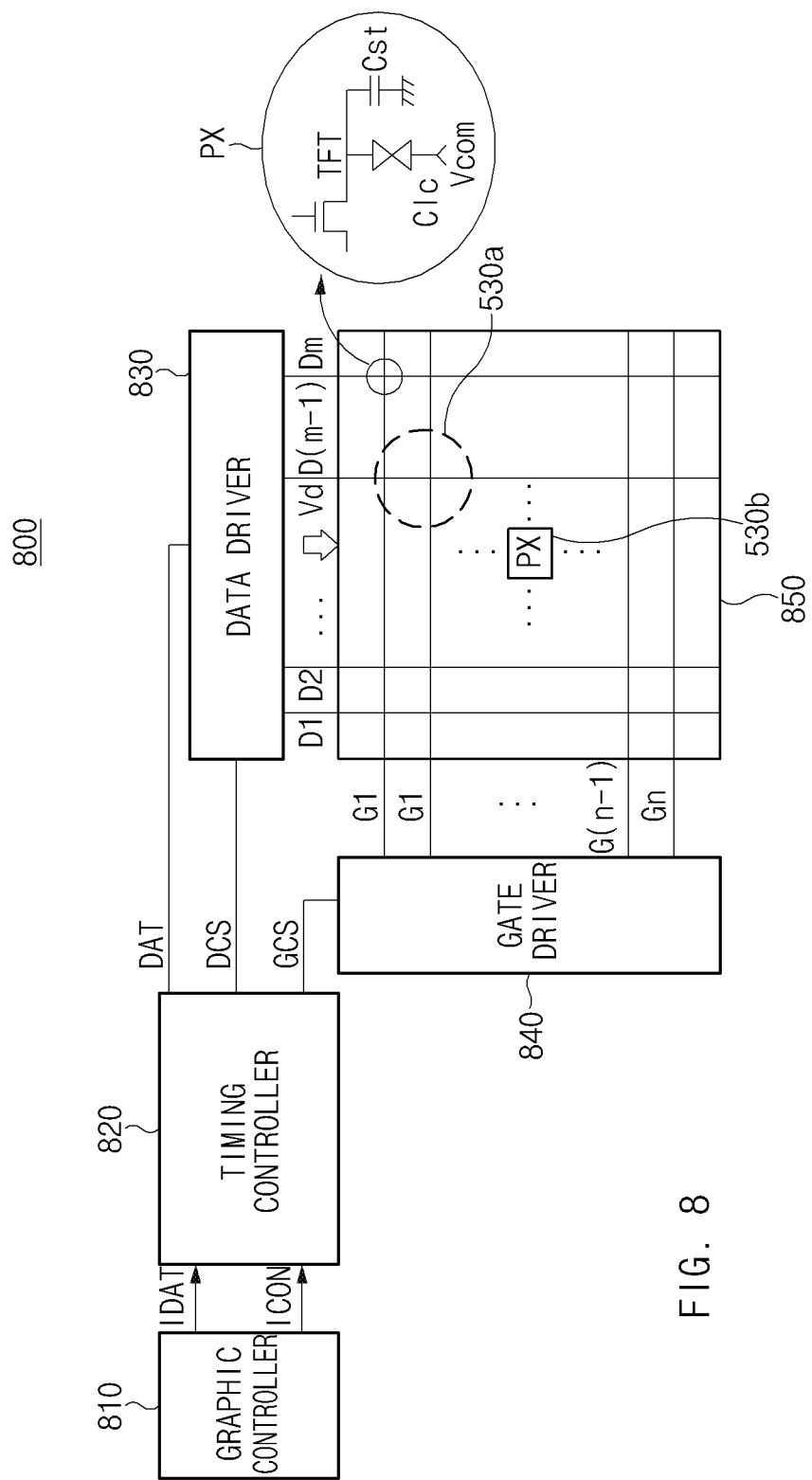
FIG. 8 is a block diagram illustrating an operation of a display of FIG. 5 according to an embodiment of the disclosure.

FIG. 8 is a block diagram illustrating an operation of a display of FIG. 5 according to an embodiment of the disclosure.

Referring to FIG. 8, a display 800 (e.g., the display 530 of FIG. 5) may include a graphic controller 810, a timing controller 820, a data driver 830, a gate driver 840, and a liquid crystal panel 850. At least one component of the display 800 may be added or omitted. The input/output relation illustrated in FIG. 8 is provided for the convenience of explanation, but the disclosure is not limited thereto.

According to an embodiment, at least one of the graphic controller 810, the timing controller 820, the data driver 830, or the gate driver 840 may be at least one hardware module having at least one processor, or at least one software module implemented by at least one processor. For example, the function performed by each module included in the graphic controller 810, the timing controller 820, the data driver 830, or the gate driver 840 may be performed by one processor or may be performed respective separate processors. The processor may include, for example, at least one of a central processing unit (CPU), a graphics processing unit (GPU), a micro-processor, an application specific integrated circuit (ASIC), or a field programmable gate array (FPGA), an LCD driver (e.g., display driver IC (DDI)), an application processor (AP), a communication processor (CP), a sensor hub, or a touch sensor IC and may have a plurality of cores.

According to an embodiment, the liquid crystal panel 850 may include a switching device (e.g., the first switching device 631a or the second switching device 631b) formed in each pixel (PX) 530b (or the sensor area 530a) defined by at least one data line D1 to Dm and at least one gate line G1 to Gn, and a liquid crystal capacitor Clc and a storage capacitor Cst connected with the switching device. The switching device may supply a data voltage Vd, which is generated from each of the data lines D1 to Dm, to the pixel electrode (e.g., the second electrode 535b or the third electrode 535c) in response to a gate voltage from each of the gate lines G1 to Gn. The liquid crystal capacitor Clc is charged with a differential voltage between a data voltage supplied to the pixel electrode and a common voltage supplied to a common electrode (e.g., the first electrode 535a) and adjusts the light transmittance of a liquid crystal based on the differential voltage, thereby realizing a desired image. The storage capacitor Cst may hold the voltage charged in the liquid crystal capacitor Clc until the next data voltage Vd is supplied.

According to an embodiment, the data driver 830 may receive an image signal DAT for a pixel of each line in response to a data control signal DCS from the timing controller 820. For example, the data driver 830 may transform the image signal DAT into a data voltage Vd, which is to be transmitted to the data lines D1 to Dm, and apply the data voltage Vd to each of the data lines D1 to Dm, by selecting a gray scale voltage corresponding to the image signal DAT (a gray scale value) from the timing controller 820.

According to various embodiments, the data driver 830 may control the polarity of the data voltage Vd, which is applied to each pixel (or the sensor area 530a) to be opposite to the polarity of a previous frame, in response to an inverted signal of the data control signal DCS (called "frame inversion"). According to an embodiment, the polarity of the data voltage Vd applied to the whole pixels 530b may be inverted in the frame inversion of the liquid crystal panel 850. The polarity of a data voltage Vd applied to one data line D1 to Dm in one frame may be periodically changed, based on the characteristic of the inverted signal, and polarities of the data voltages Vd applied to data lines D1 to Dm in pixel rows may be different from each other, based on the characteristic of the inverted signal.

According to an embodiment, the gate driver 840 may turn on a switching device connected with each of the gate lines G1 to Gn by applying a gate-on voltage to the gate lines G1 to Gn in response to a gate control signal GCS received from the timing controller 820. Then, the data voltage Vd applied to the gate lines G1 to Gn may be applied to a relevant pixel through the turned-on switching device to serve as a voltage (pixel voltage) charged in each pixel. After a data voltage is applied to a pixel of the liquid crystal panel 850, the pixel may represent brightness corresponding to the data voltage through various optical elements. According to various embodiments, the gate driver 840 may repeat the above-described procedure in every horizontal period (which is the same as one period of a horizontal synchronization signal (Hsync) and a data enable signal) to sequentially apply the gate-on voltage Von to all gate lines G1 to Gn of the liquid crystal panel 850 and to apply the data voltage Vd to all pixels 530b, thereby displaying an image of one frame.

According to an embodiment, the graphic controller 810 may process at least one of image data received from the outside or image data stored in the memory (e.g., the memory 130) to generate input image data IDAT and then to transmit the image data signal IDAT and an input control signal ICON to the timing controller 820. The input control signal ICON may include at least one of a vertical synchronization signal Vsync, a horizontal synchronization signal Hsync, a dot clock DCLK, or a data enable signal DE. The graphic controller 810 may be, for example, a central processing unit of the display 800. The input image data IDAT may have R, G, and B values for representing various resolutions such as High Definition (HD), Full HD (FHD), and Ultra-HD (UHD).

According to various embodiments, the liquid crystal panel 850 may include the sensor area 530a. For example, the sensor module (e.g., the sensor module 601) may be disposed under the sensor area 530a. In the sensor area 530a, the timing controller 820 (e.g., DDI) may control signals (e.g., a data voltage Vd or a gate on voltage (Von)) applied to a pixel electrode to be different from the screen area other than the sensor area 530a. The timing controller 820 may control signals applied to the pixel electrode of the sensor area 530a depending on whether the sensor module is activated.

Figure 9A:
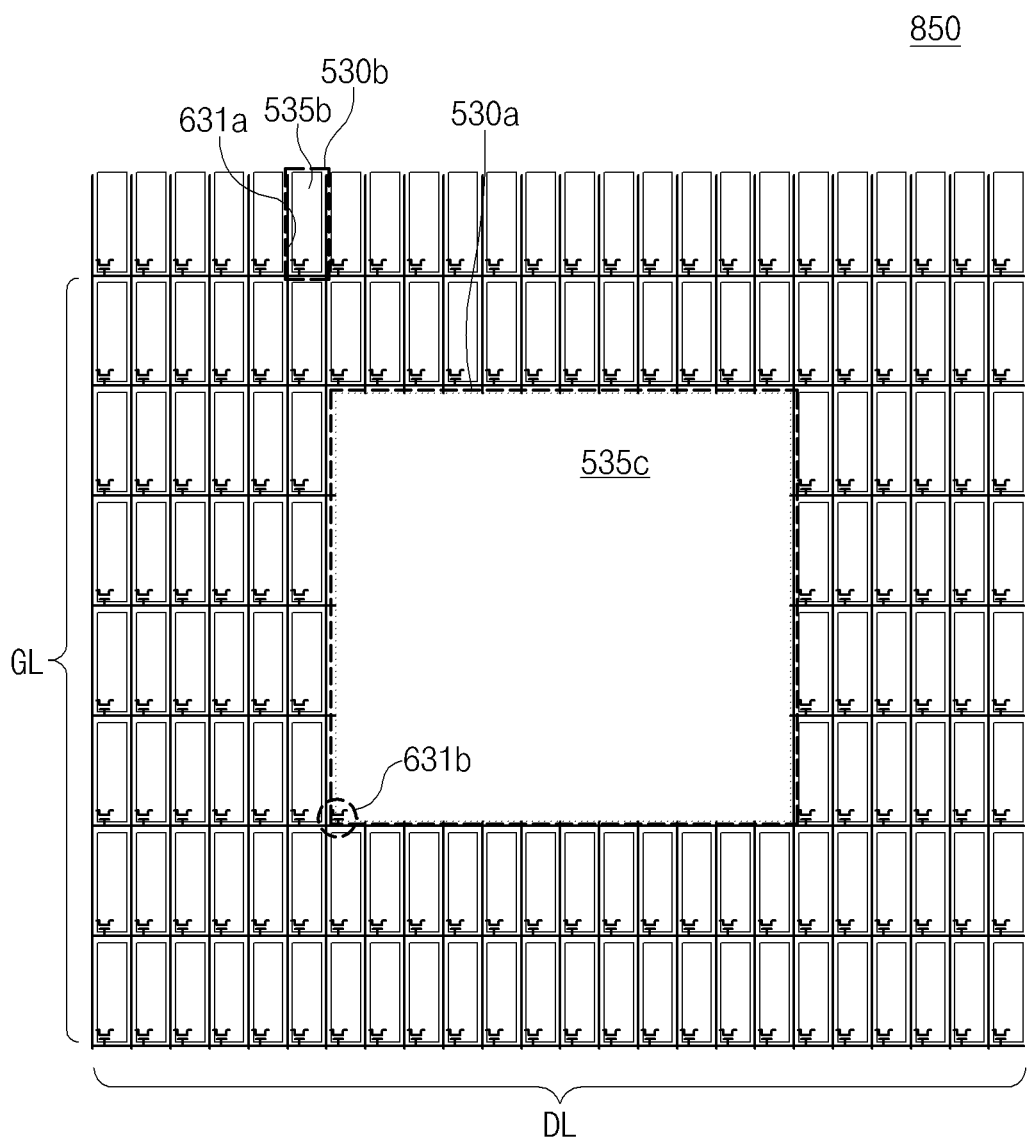
FIG. 9A is a view illustrating a display panel structure in a sensor area according to an embodiment of the disclosure.
Figure 9B:
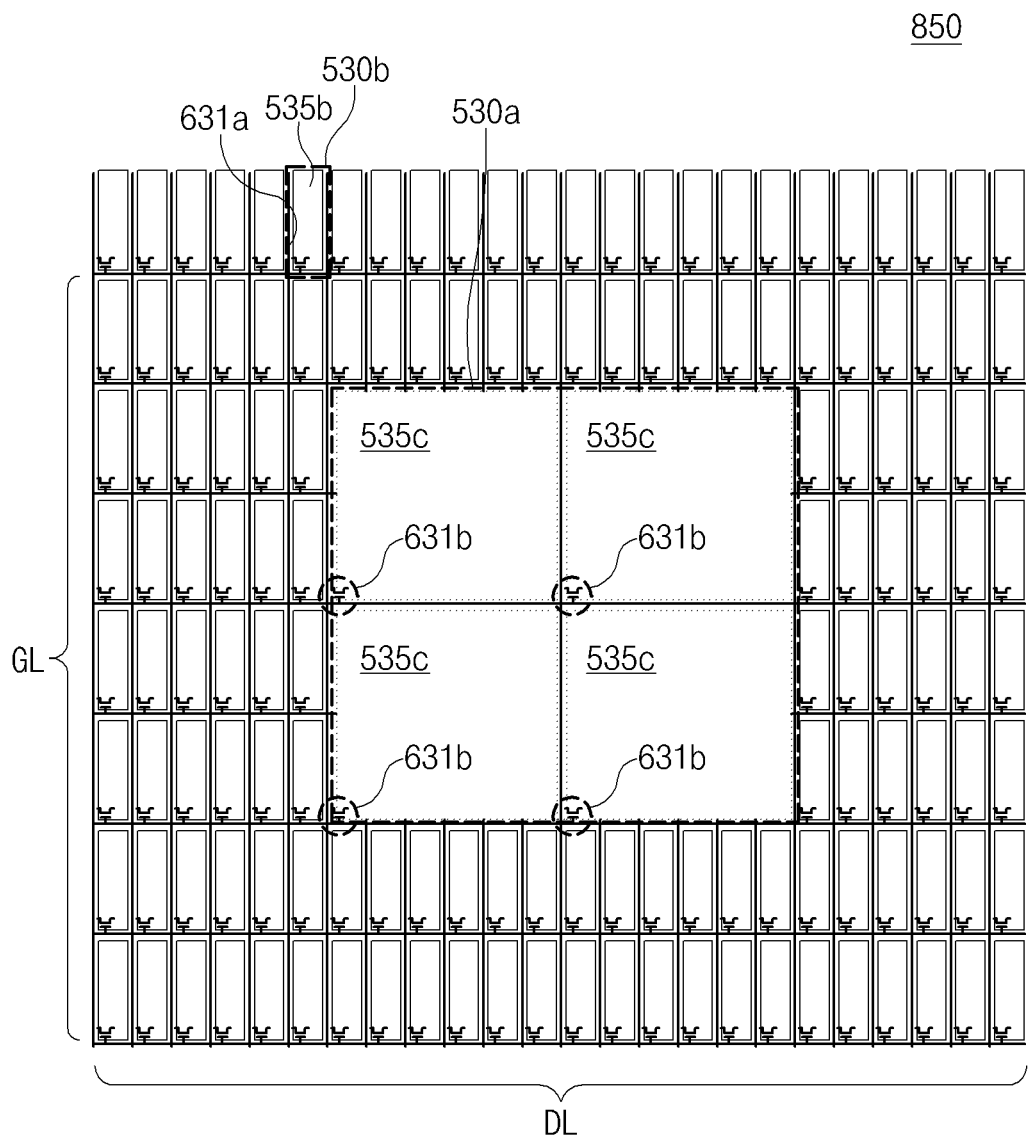
FIG. 9B is a view illustrating another display panel structure in a sensor area according to an embodiment of the disclosure.
Figure 9C:
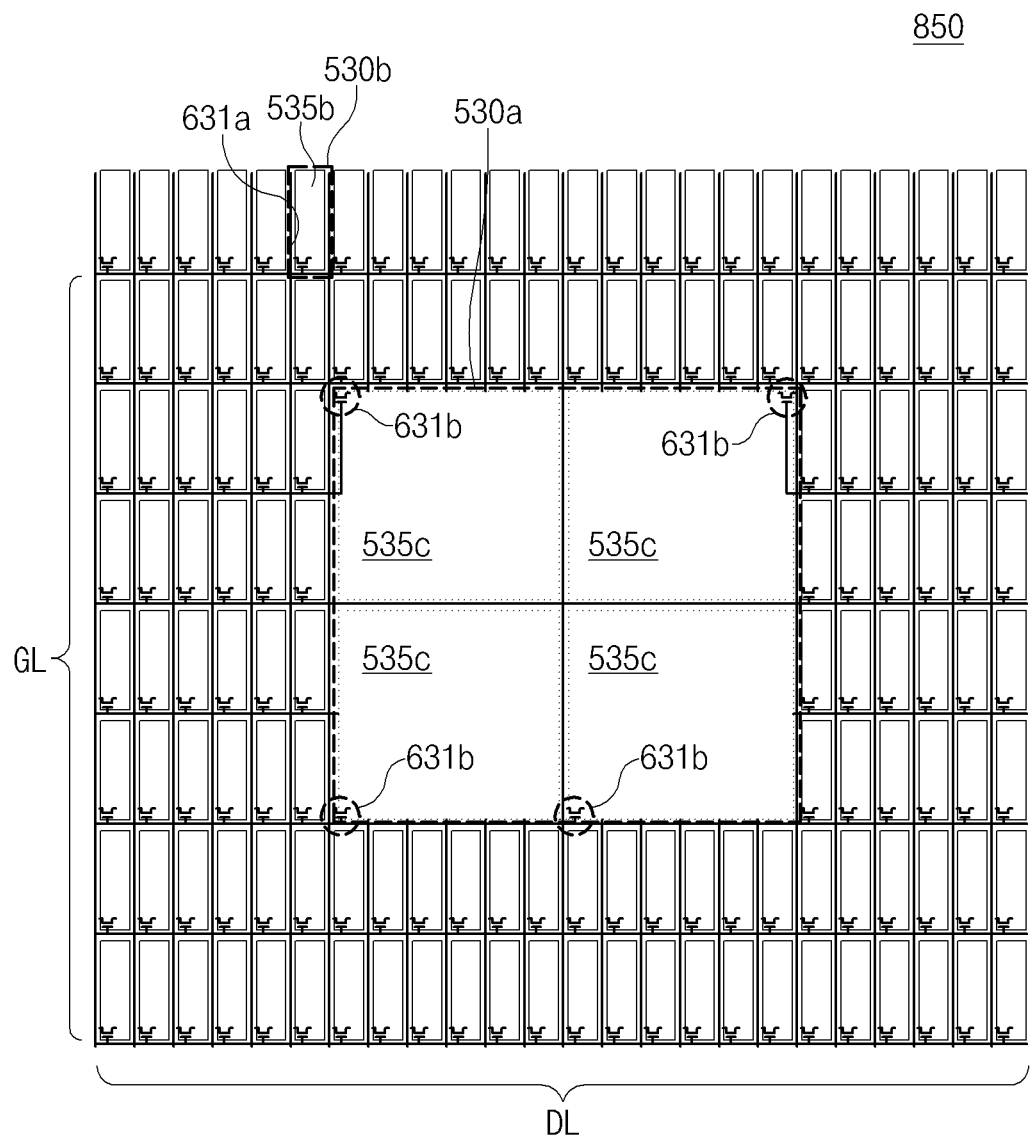
FIG. 9C is a view illustrating another display panel structure in a sensor area according to an embodiment of the disclosure.

FIGS. 9A to 9C are views illustrating various display panel structures of the sensor area according to various embodiments of the disclosure.

Referring to FIGS. 6A, and 9A to 9C, one pixel 530b may be disposed at one point at which the data line DL and the gate line GL of the liquid crystal panel 850 crosses each other, in the screen area. One pixel 530b may include the second electrode 535b and the first switching element 631a. The sensor area 530a may include at least one third electrode 535c and at least one second switching device 631b.

According to an embodiment, an area of one third electrode 535c may correspond to an area of a plurality of second electrodes 535b. The number of third electrodes 535c per unit area may be smaller than the number of second electrodes 535b per unit area. The number of second switching devices 631b per unit area may be smaller than the number of first switching devices 631a per unit area.

Referring to FIG. 9A, the sensor area 530a may be driven through one third electrode 535c and one second switching device 631b.

Referring to FIGS. 9B and 9C, the sensor area 530a may be driven through a plurality of third electrodes 535c and a plurality of second switching devices 631b. Although FIGS. 9B and 9C illustrate third electrodes 535c dividing the sensor area 530a into four parts, the arrangement manner of the third electrodes 535c is not limited thereto.

Referring to FIG. 9C, the second switching devices 631b and wires in the sensor area 530a may be disposed at a position (e.g., the outer portion of the sensor area 530a) which does not exert an influence on the performance of the sensor module 610.

According to various embodiments, in the sensor area 530a, the third electrodes 535c may be arranged such that the distances between the third electrodes 535c are not equal to each other (or the distances between the third electrodes 535c are random). For example, lights transmitted through the sensor area 530a are diffracted by the third electrodes 535c, and when the distances between the third electrodes 535c are equal to each other, the lights are canceled or superposed by the diffracted lights. To prevent the lights from being canceled or superposed due to such diffraction, the third electrodes 535c may be arranged such that the distances between the third electrodes 535c are not equal to each other (or the distances between the third electrodes 535c are random). For example, the third electrodes 535c may be formed in mutually different sizes.

Figure 10A:
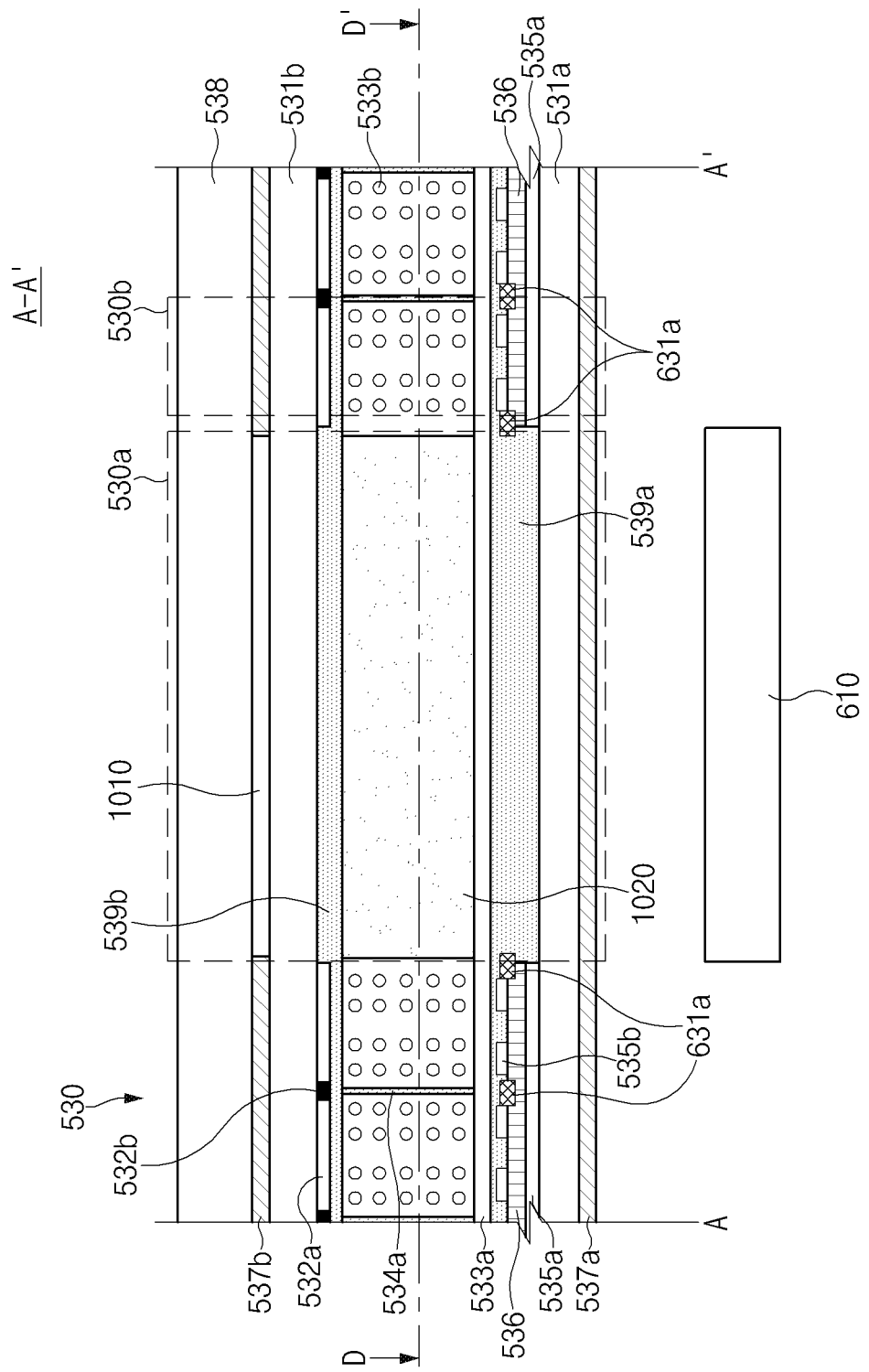
FIG. 10A illustrates a cross-section taken along line A-A' of FIG. 5, according to an embodiment of the disclosure.

FIG. 10A illustrates a cross-section taken along line A-A' of FIG. 5 according to an embodiment of the disclosure.

Referring to FIG. 10A, the sensor module 610 (e.g., the sensor module 204, the camera module 205, or the light emitting device 206) may be disposed on the back surface of the sensor area 530a of the display 530. According to an embodiment, the display 530 may include a stack structure of a plurality of layers formed based on the first substrate 531a (e.g., a lower substrate) and a second substrate 531b (e.g., an upper substrate). The display 530 may be formed by combining a first part including the first substrate 531a with a second part including the second substrate 531b.

According to an embodiment, the display 530 may include the sensor area 530a corresponding to the position of the sensor module 610, and the screen area other than the sensor area 530a. At least a portion of the stack structure of the screen area may be identical to similar to the stack structure of the screen area of FIG. 6A. Accordingly, hereinafter, the description of the identical or similar part will be omitted.

According to an embodiment, in the sensor area 530a, the first part may include the first substrate 5310a and the liquid crystal alignment layer 533a. For example, the liquid crystal alignment layer 533a may be stacked on the first substrate 531a through the adhesive member 539a. The first substrate 531a, the liquid crystal alignment layer 533a, and the adhesive member 539a may be formed of a transparent material.

According to an embodiment, in the sensor area 530a, the second part may include the second substrate 531b and the window glass 538. For example, the window glass 538 may be stacked on the second substrate 531b. A transparent adhesive member 1010 (e.g., PSA) may be filled in the space between the second substrate 531b and the window glass 538. The second substrate 531b, the window glass 538, and the adhesive member 539a may be formed of a transparent material.

According to an embodiment, in the sensor area 530a, a space maintaining pillar 1020 (e.g., a spacer or a sealant) may be interposed between the first part and the second part. For example, the space maintaining pillar 1020 may be stacked on the liquid crystal alignment layer 533a. The space maintaining pillar 1020 may be coupled to the second substrate 531b through the adhesive member 539a. The space maintaining pillar 1020 may be formed of a transparent material. The space maintaining pillar 1020 may be formed of a material having a refractive index identical or similar to refractive indexes of the first substrate 531a and the second substrate 531b. According to various embodiments, the space maintaining pillar 1020 may prevent a light, which passes through the sensor area 530a, from being diffracted as the second part is deformed in the sensor area 530a.

According to various embodiments, an additional support member (e.g., a partition) may be disposed on a side surface of the space maintaining pillar 1020. For example, the additional support member may prevent a material, which constitutes the space maintaining pillar 1020, from overflowing, when forming the space maintaining pillar 1020. The height of the additional support member may be equal to or smaller than the height of the first support member 534a. When the height of the additional support member is lower than the height of the first support member 534a, the material constituting the space maintaining pillar 1020 is filled to slightly flow over the additional support member. Accordingly, the space maintaining pillar 1020 may be sufficiently filled in the sensor area 530a.

Figure 10B:
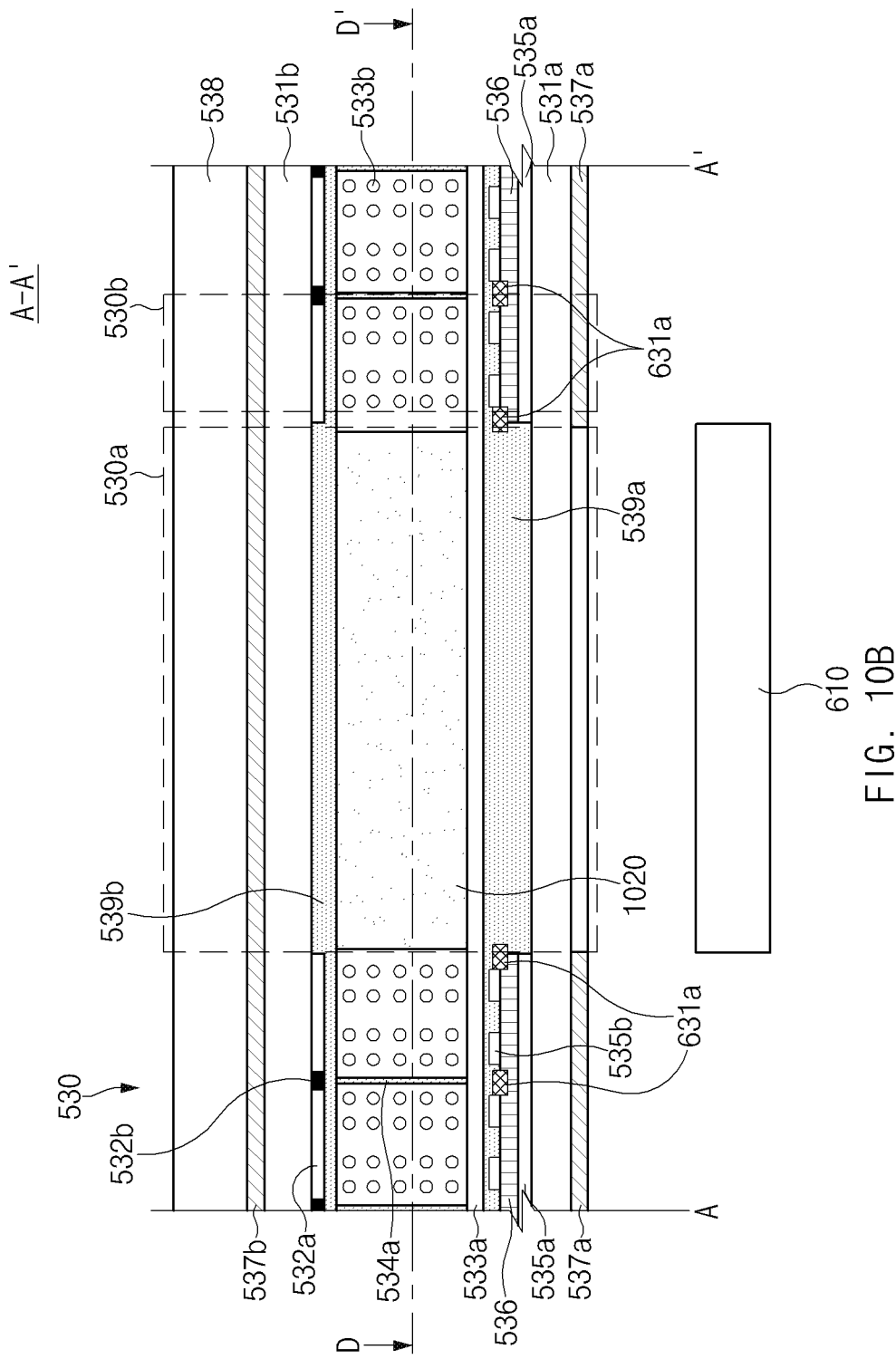
FIG. 10B illustrates another cross-section taken along line A-A' of FIG. 5 according to an embodiment of the disclosure.

FIG. 10B illustrates another cross-section taken along line A-A' of FIG. 5 according to an embodiment of the disclosure.

At least some of components of the display 530 of FIG. 10B may be identical to or similar to at least some of components of the display 530 of FIG. 10A. Accordingly, the description of components identical to or similar to the components of FIG. 10A may be omitted below.

According to an embodiment, the second polarizing plate 537b may be maintained in the sensor area 530a and the first polarizing plate 537a may be removed from the sensor area 530a. Accordingly, the external light 690 may be transmitted similarly to the case in FIG. 7A.

Figure 10C:
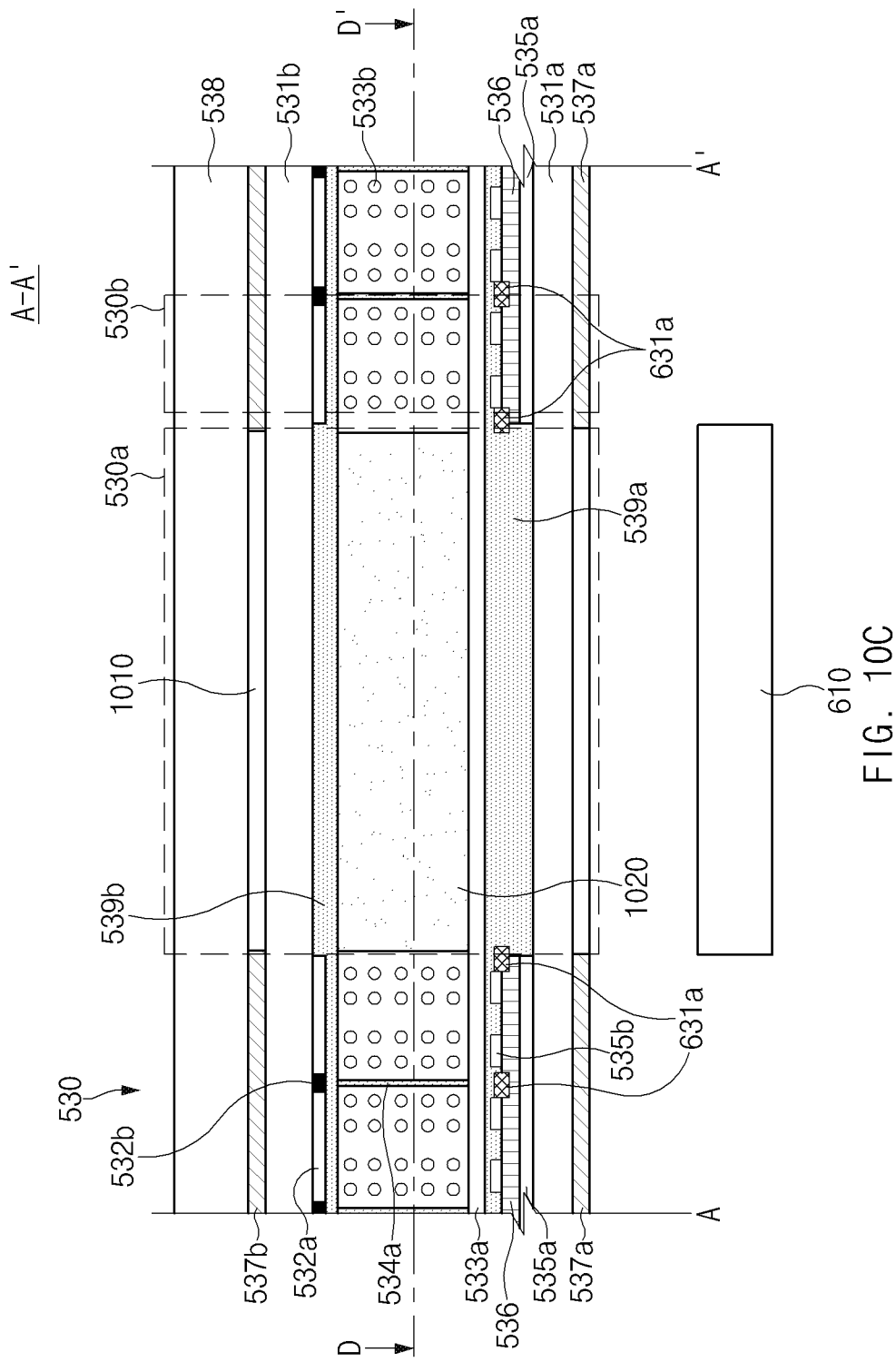
FIG. 10C illustrates another cross-section taken along line A-A' of FIG. 5 according to an embodiment of the disclosure.

FIG. 10C illustrates another cross-section taken along line A-A' of FIG. 5 according to an embodiment of the disclosure.

At least some of components of the display 530 of FIG. 10C may be identical to or similar to at least some of components of the display 530 of FIG. 10B. Accordingly, the description of components identical to or similar to the components of FIG. 10B may be omitted below.

According to an embodiment, the first polarizing plate 537a and the second polarizing plate 537b may be removed from the sensor area 530a. In addition, the first electrode 535a, the third electrode 535c, and the insulating layer 536 may be removed from the sensor area 530a. Accordingly, the external light 690 may be more excellently transmitted as compared with the case in FIG. 10B.

According to various embodiments, a part having no second polarizing plate 537b may be filled with the transparent adhesive member 1010 (e.g., PSA). A part having no first electrode 535a, third electrode 535c, and insulating layer 536 may be filled with the first adhesive member 539a.

Figure 10D:
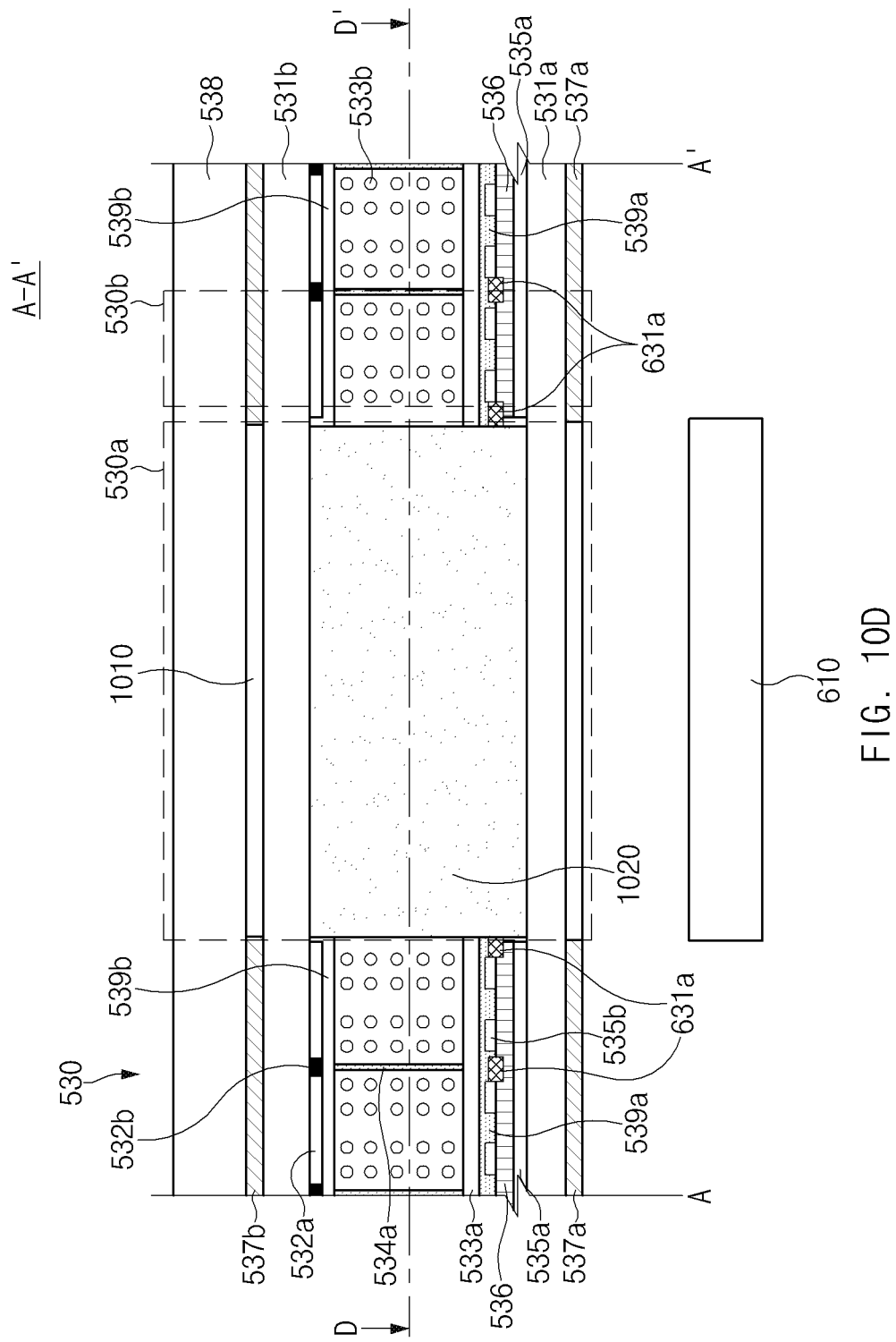
FIG. 10D illustrates another cross-section taken along line A-A' of FIG. 5 according to an embodiment of the disclosure.

FIG. 10D illustrates another cross-section taken along line A-A' of FIG. 5 according to an embodiment of the disclosure.

At least some of components of the display 530 of FIG. 10D may be identical to or similar to at least some of components of the display 530 of FIG. 10C. Accordingly, the description of components identical to or similar to the components of FIG. 10C may be omitted below.

According to an embodiment, the first polarizing plate 537a and the second polarizing plate 537b may be removed from the sensor area 530a. In addition, the first electrode 535a, the third electrode 535c, and the insulating layer 536 may be removed from the sensor area 530a. In addition, the liquid crystal alignment layer 533a, the first adhesive member 539a, and the second adhesive member 539b may be removed from the sensor area 530a. Accordingly, the external light 690 may be more excellently transmitted as compared with the case in FIG. 10C.

According to various embodiments, a part having no the second polarizing plate 537b may be filled with the transparent adhesive member 1010 (e.g., PSA). According to another embodiment, a part having no first electrode 535a, third electrode 535c, insulating layer 536, liquid crystal alignment layer 533a, first adhesive member 539a, and second adhesive member 539b may be filled with the space maintaining pillar 1020.

Figure 10E:
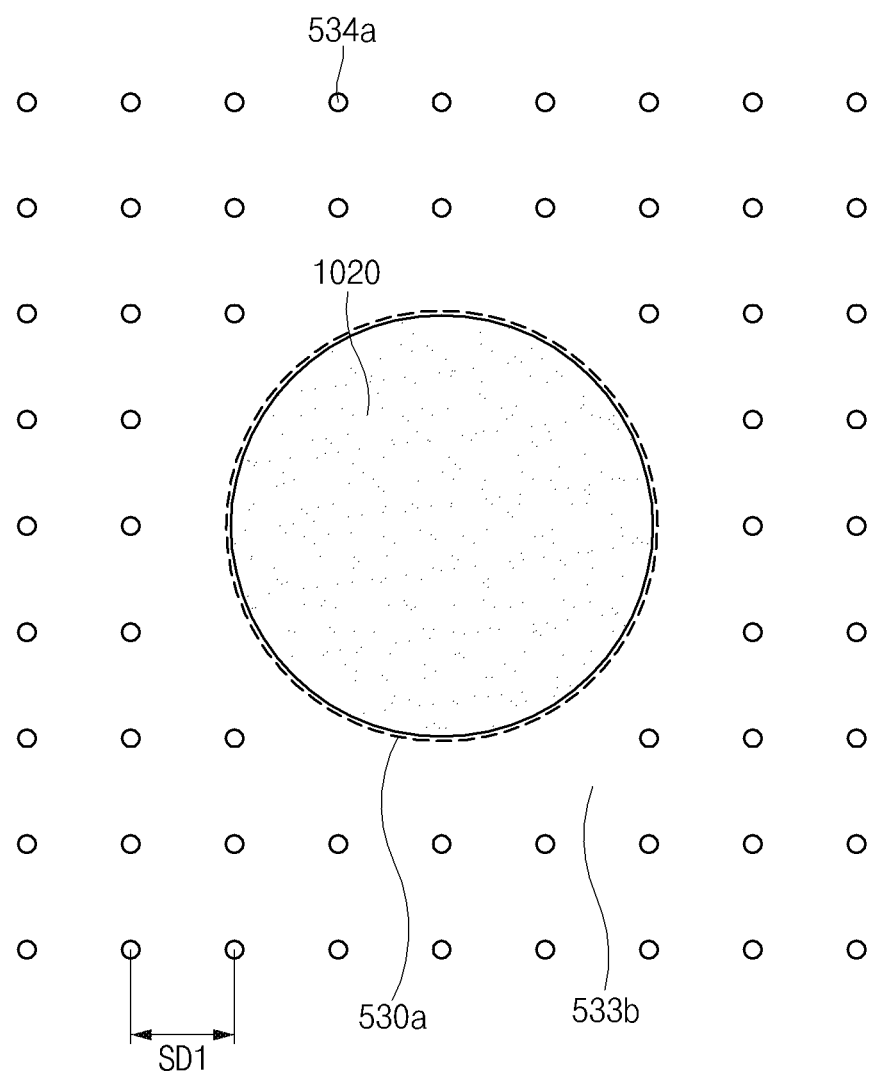
FIG. 10E illustrates a cross-section taken along line D-D' in FIG. 10A (or FIG. 10B, 10C, or 10D) according to an embodiment of the disclosure.

FIG. 10E illustrates a cross-section taken along line D-D' in FIG. 10A (or FIG. 10B, 10C, or 10D) according to an embodiment of the disclosure.

Referring to FIGS. 10A and 10E, the space maintaining pillar 1020 may be formed to correspond to the sensor area 530a. When the sensor area 530a is viewed from the top, the space maintaining pillar 1020 may be formed in a size equal to or approximate to the size of the sensor area 530a.

Figure 11A:
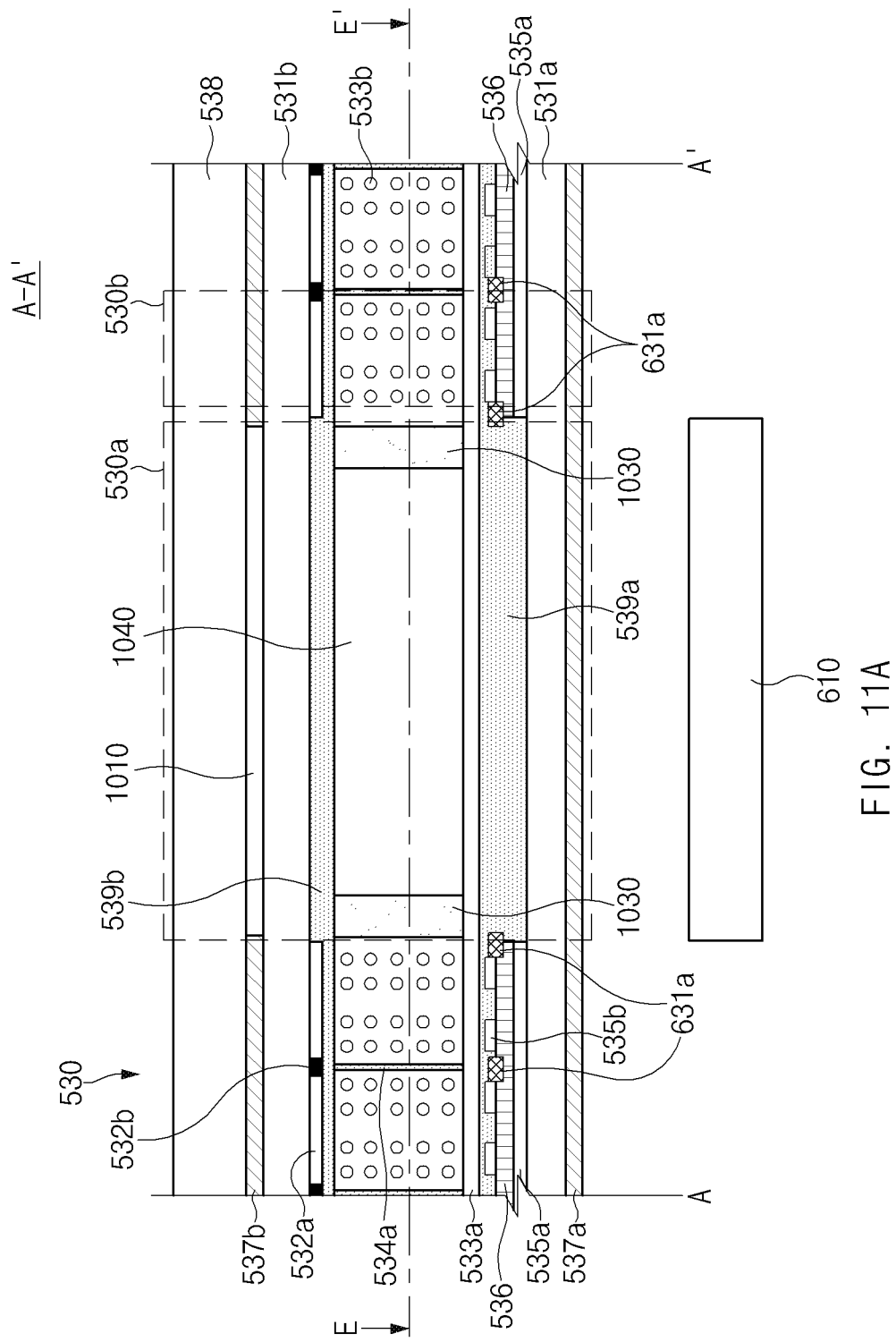
FIG. 11A is a view illustrating a cross-section taken along line A-A' of FIG. 5, according to an embodiment of the disclosure.

FIG. 11A is a view illustrating a cross-section taken along line A-A' of FIG. 5, according to an embodiment of the disclosure.

Referring to FIG. 11A, the sensor module 610 (e.g., the sensor module 204, the camera module 205, or the light emitting device 206) may be disposed on the back surface of the sensor area 530a of the display 530. According to an embodiment, the display 530 may include a stack structure of a plurality of layers formed based on the first substrate 531a (e.g., a lower substrate) and a second substrate 531b (e.g., an upper substrate). The display 530 may be formed by combining a first part including the first substrate 531a with a second part including the second substrate 531b.

According to an embodiment, the display 530 may include the sensor area 530a corresponding to the position of the sensor module 610, and the screen area other than the sensor area 530a. At least a portion of the stack structure of the sensor area 530a and the screen area may be identical to similar to the stack structure of the sensor area 530a and the screen area of FIG. 10A. Accordingly, hereinafter, the description of the identical or similar part will be omitted.

According to an embodiment, in the sensor area 530a, the space maintaining pillar 1030 (e.g., a spacer or a sealant) may be interposed between the first part and the second part. For example, the space maintaining pillar 1030 may be stacked on the liquid crystal alignment layer 533a. The space maintaining pillar 1030 may be coupled to the second substrate 531b through the adhesive member 539a. The space maintaining pillar 1030 may be formed of a transparent material. According to various embodiments, a part 1040 of the space maintaining pillar 1030 may be provided in the form of an empty space. Alternatively, the empty space may be filled with a material such as the transparent adhesive member 1010. The space maintaining pillar 1030 may prevent a light, which passes through the sensor area 530a, from being diffracted as the second part is deformed in the sensor area 530a. According to various embodiments, an opaque member (e.g., the opaque member 532b, a BM, or a printed BM) may be disposed over the space maintaining pillar 1030, which is similar to the first support member 534a. According to various embodiments, a coating (e.g., an anti-reflection (AR) coating) may be formed over or under the first substrate 531a or the second substrate 531b to reduce the reflection of light.

According to various embodiments, an additional support member (e.g., a partition) may be disposed on an external side surface and an internal side surface of the space maintaining pillar 1030. For example, the additional support member may prevent a material, which constitutes the space maintaining pillar 1030, from overflowing when forming the space maintaining pillar 1030. The height of the additional support member may be equal to or smaller than the height of the first support member 534a. When the height of the additional support member is lower than the height of the first support member 534a, the material constituting the space maintaining pillar 1030 is filled to slightly flow over the additional support member. Accordingly, the space maintaining pillar 1030 may be sufficiently filled in a specified shape in the sensor area 530a.

Figure 11B:
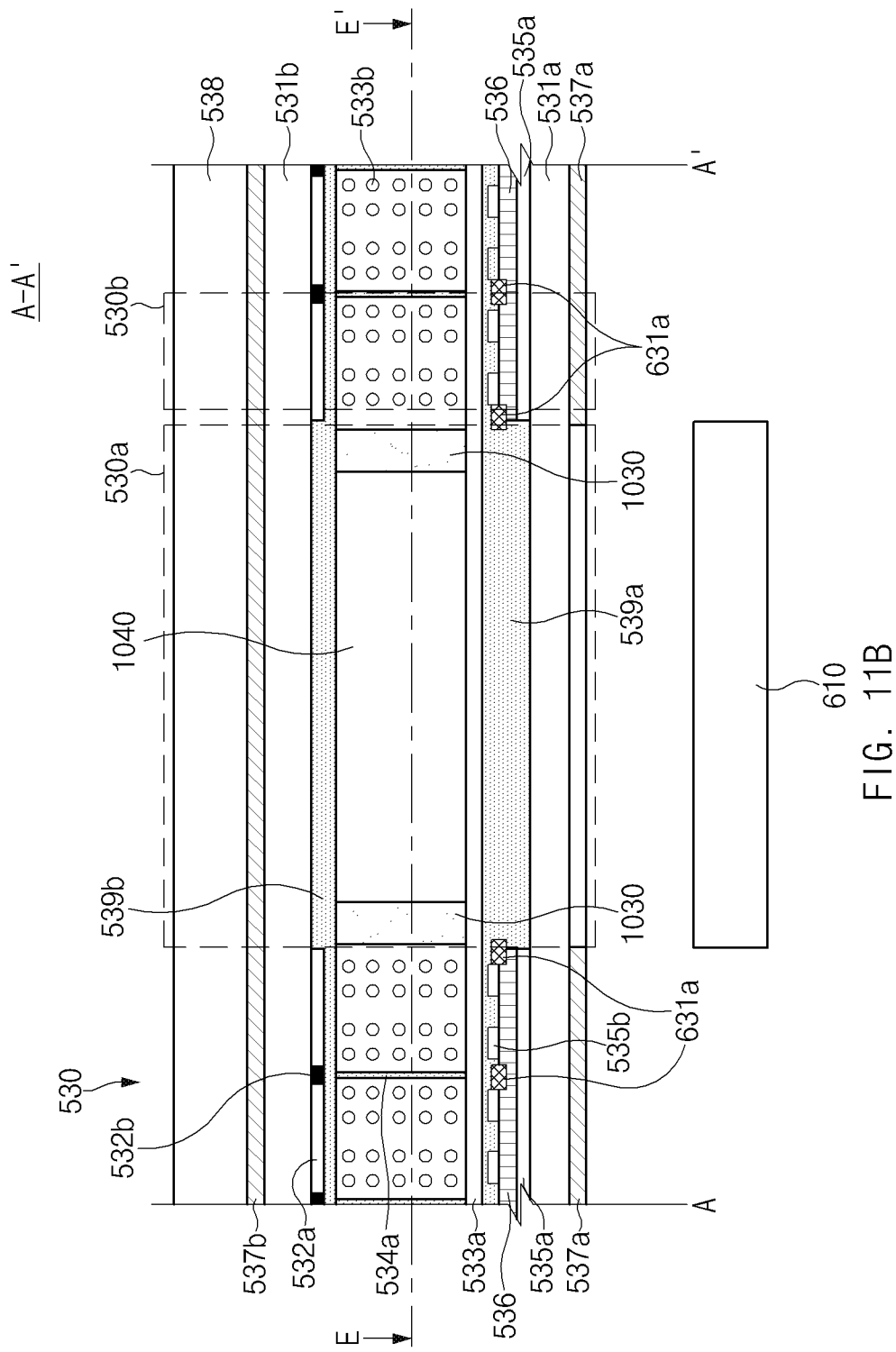
FIG. 11B is a view illustrating another cross-section taken along line A-A' of FIG. 5 according to an embodiment of the disclosure.

FIG. 11B illustrates another cross-section taken along line A-A' of FIG. 5 according to an embodiment of the disclosure.

At least some of components of the display 530 of FIG. 11B may be identical to or similar to at least some of components of the display 530 of FIG. 11A. Accordingly, the description of components identical to or similar to the components of FIG. 11A may be omitted below.

According to an embodiment, the second polarizing plate 537b may be maintained in the sensor area 530a and the first polarizing plate 537a may be removed from the sensor area 530a. Accordingly, the external light 690 may be transmitted similarly to the case in FIG. 7A.

Figure 11C:
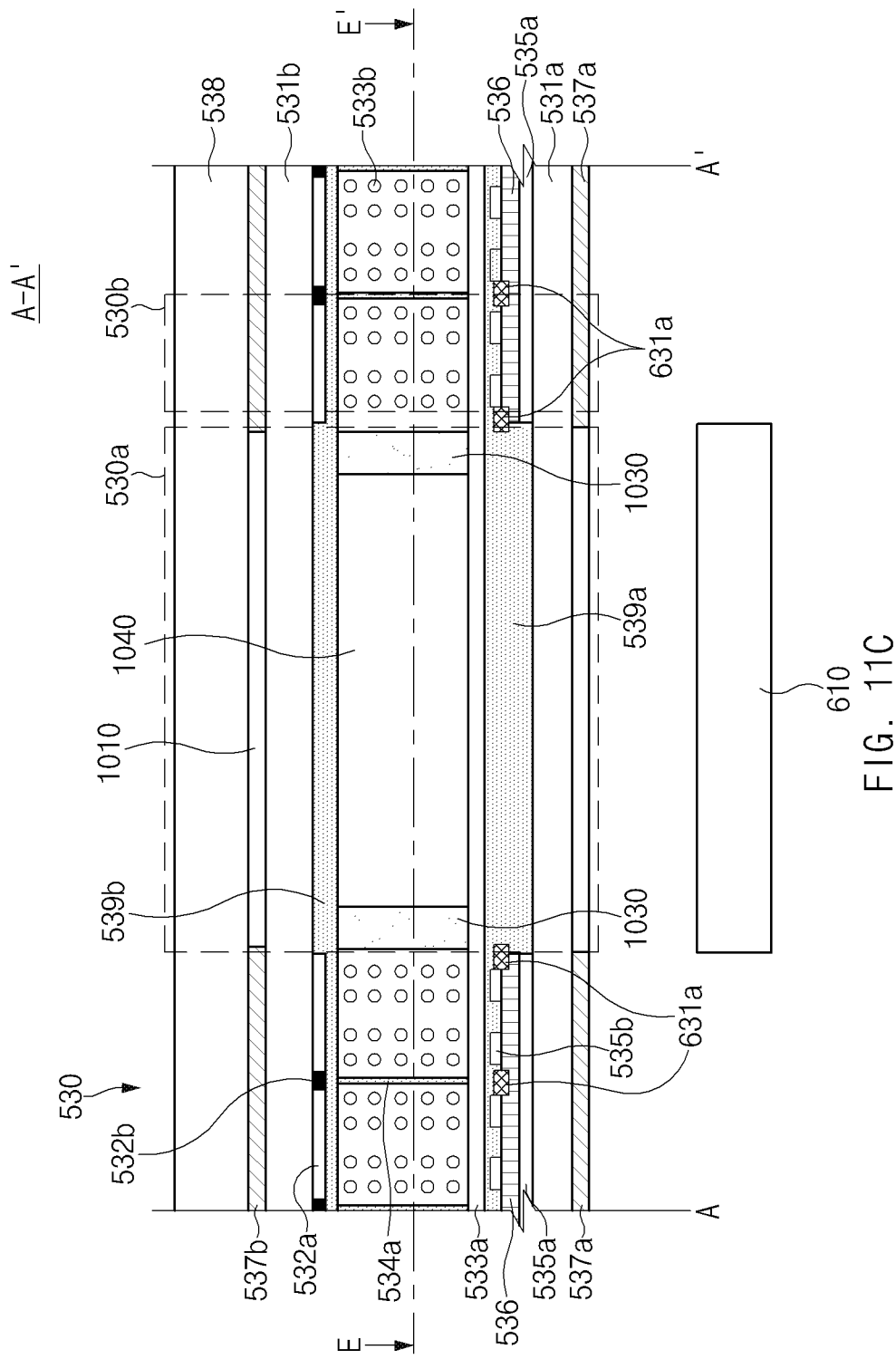
FIG. 11C is a view illustrating another cross-section taken along line A-A' of FIG. 5 according to an embodiment of the disclosure.

FIG. 11C illustrates another cross-section taken along line A-A' of FIG. 5 according to an embodiment of the disclosure.

At least some of components of the display 530 of FIG. 11C may be identical to or similar to at least some of components of the display 530 of FIG. 11B. Accordingly, the description of components identical to or similar to the components of FIG. 11B may be omitted below.

According to an embodiment, the first polarizing plate 537a and the second polarizing plate 537b may be removed from the sensor area 530a. In addition, the first electrode 535a, the third electrode 535c, and the insulating layer 536 may be removed from the sensor area 530a. Accordingly, the external light 690 may be more excellently transmitted as compared with the case in FIG. 11B.

According to various embodiments, a part having no second polarizing plate 537b may be filled with the transparent adhesive member 1010 (e.g., PSA). A part having no first electrode 535a, third electrode 535c, and insulating layer 536 may be filled with the first adhesive member 539a.

Figure 11D:
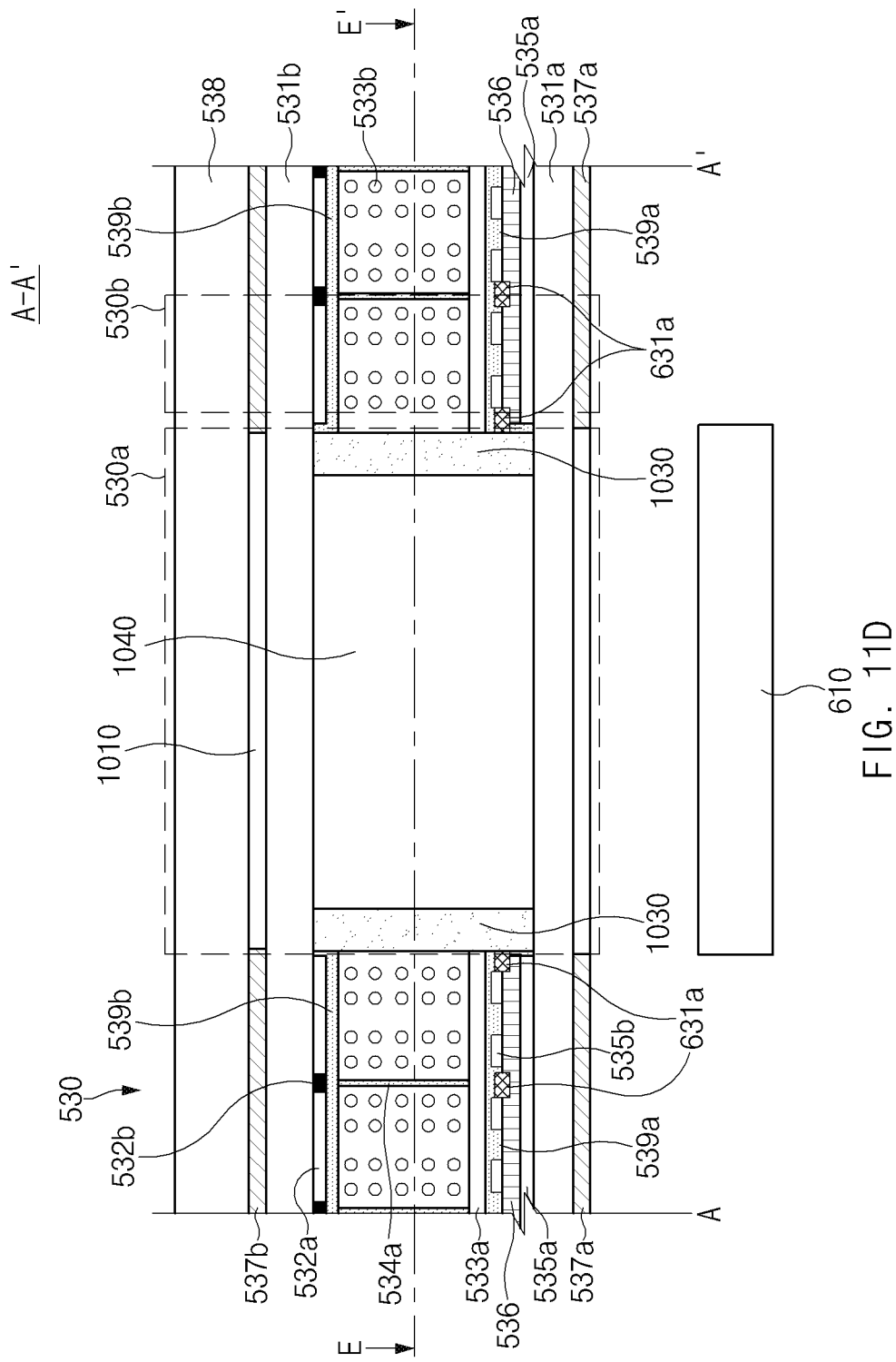
FIG. 11D is a view illustrating another cross-section taken along line A-A' of FIG. 5 according to an embodiment of the disclosure.

FIG. 11D illustrates another cross-section taken along line A-A' of FIG. 5 according to an embodiment of the disclosure.

At least some of components of the display 530 of FIG. 11D may be identical to or similar to at least some of components of the display 530 of FIG. 11C. Accordingly, the description of components identical to or similar to the components of FIG. 11C may be omitted below.

According to an embodiment, the first polarizing plate 537a and the second polarizing plate 537b may be removed from the sensor area 530a. In addition, the first electrode 535a, the third electrode 535c, and the insulating layer 536 may be removed from the sensor area 530a. In addition, the liquid crystal alignment layer 533a, the first adhesive member 539a, and the second adhesive member 539b may be removed from the sensor area 530a. Accordingly, the external light 690 may be more excellently transmitted as compared with the case in FIG. 11C.

According to various embodiments, a part having no second polarizing plate 537b may be filled with the transparent adhesive member 1010 (e.g., PSA). According to another embodiment, a part having no first electrode 535a, the third electrode 535c, insulating layer 536, liquid crystal alignment layer 533a, first adhesive member 539a, and second adhesive member 539b may be filled with the space maintaining pillar 1030. According to various embodiments, a part 1040 of the space maintaining pillar 1020 may be provided in the form of an empty space. Alternatively, the empty space may be filled with a material such as the transparent adhesive member 1010.

Figure 11E:
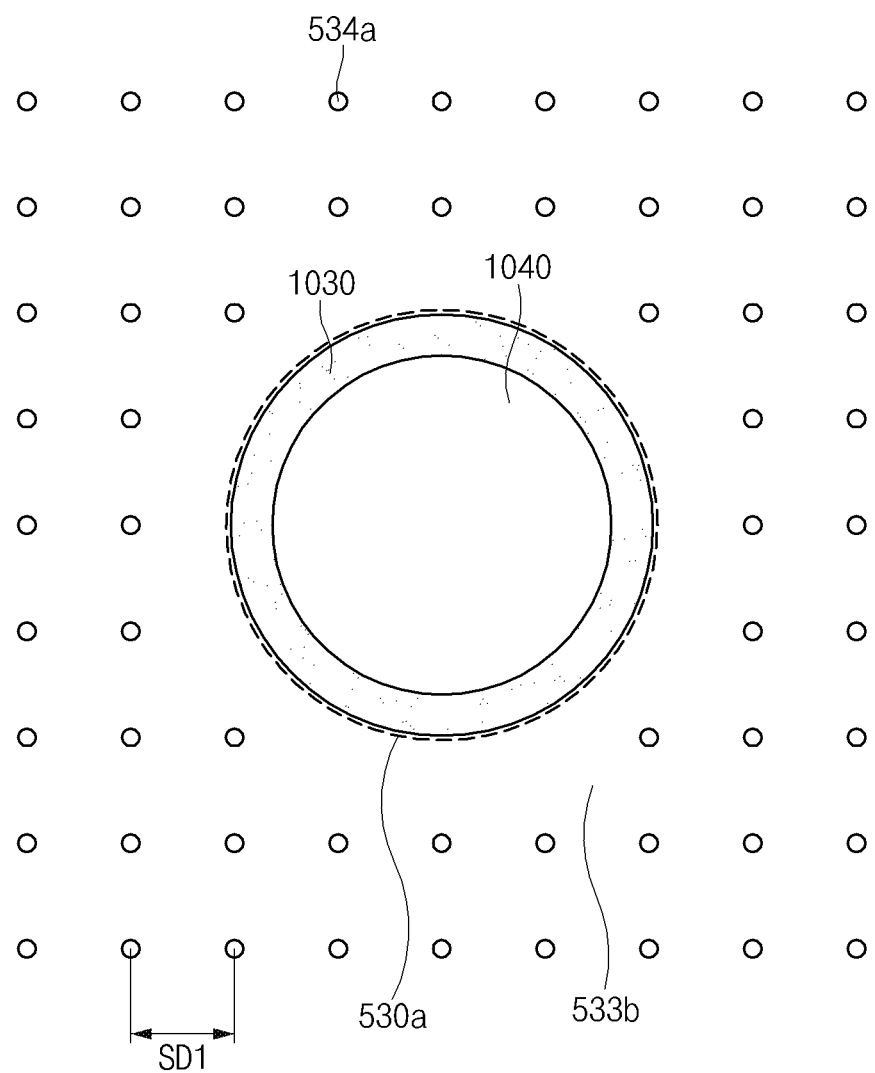
FIG. 11E illustrates a cross-section taken along line E-E' in FIG. 11A (or FIG. 11B, 11C, or 11D) according to an embodiment of the disclosure.

FIG. 11E illustrates a cross-section taken along line E-E' in FIG. 11A (or FIG. 11B, 11C, or 11D) according to an embodiment of the disclosure.

Referring to FIGS. 11A and 11B, the space maintaining pillar 1030 may be formed based on the boundary shape between the sensor area 530a and the screen area. According to various embodiments, a part 1040 of the space maintaining pillar 1030 may be provided in the form of an empty space. Alternatively, the empty space may be filled with a material such as the transparent adhesive member 1010.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory storage medium" means a tangible device, and does not include a signal (e.g., an electromagnetic wave), but this term does not differentiate between where data is semi-permanently stored in the storage medium and where the data is temporarily stored in the storage medium. For example, "the non-transitory storage medium" may include a buffer where data is temporally stored.

According to an embodiment, a method according to various embodiments of the disclosure may be included and provided in a computer program product. The computer program product may be traded as a product between a seller and a buyer. The computer program product (e.g., downloadable app)) may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to embodiments disclosed in the disclosure, when the sensor module is disposed under the display, the light transmittance of the display area corresponding to the sensor module may be improved.

Besides, a variety of effects directly or indirectly understood through the disclosure may be provided.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
    a display including:
        a sensor area in at least a part of the display,
        a screen area surrounding the sensor area,
        a boundary area between the sensor area and the screen area,
        a liquid crystal,
        a plurality of pixel electrodes,
        a first switching device disposed in the screen area,
        a second switching device disposed in the boundary area, and
        support members to maintain a space in which the liquid crystal is disposed, the support members including at least one first support member included in the screen area, and at least one second support member included in the boundary area, wherein an arrangement of the at least one first support member is different from an arrangement of the at least one second support member;
    a sensor module disposed under the sensor area; and
    a processor operatively connected with the display and the sensor module,
    wherein at least one pixel electrode included in the sensor area is disposed differently from pixel electrodes included in the screen area, and
    wherein a liquid crystal in the sensor area is driven through the second switching device and the at least one pixel electrode in the sensor area.

2. The electronic device of claim 1,
    wherein the display includes a color filter in the screen area, and
    wherein the color filter is absent in the sensor area.

3. The electronic device of claim 1, wherein the display further comprises:
    a first electrode to receive a first voltage;
    a second electrode disposed in the screen area and configured to receive a second voltage, which forms a specified potential difference from the first voltage, to change a state of a part of the liquid crystal; and
    a third electrode disposed in the sensor area, and configured to receive a third voltage, which forms a specified potential difference from the first voltage, to change a state of another part of the liquid crystal,
    wherein the first switching device is connected with the second electrode, and
    wherein the second switching device is connected with the third electrode.

4. The electronic device of claim 3,
    wherein the second electrode includes a plurality of second electrodes,
    wherein the third electrode includes a plurality of third electrodes,
    wherein the first switching device includes a plurality of first switching devices,
    wherein the second switching device includes a plurality of second switching devices,
    wherein the liquid crystal corresponding to the sensor area is driven through the plurality of the second switching devices and the plurality of the third electrodes, and
    wherein a number of the third electrodes per unit area is smaller than the number of the second electrodes per unit area.

5. The electronic device of claim 4, wherein the second switching devices per unit area is smaller than the first switching devices per unit area.

6. The electronic device of claim 4, wherein the plurality of the third electrodes are formed in mutually different sizes, in the sensor area.

7. The electronic device of claim 3, wherein the at least one first support member and the at least one second support member are formed of an identical material.

8. The electronic device of claim 3, wherein the at least one second support member is disposed radially from a center of the sensor area.

9. The electronic device of claim 3,
    wherein the at least one first support member is disposed at a first distance corresponding to a size of a pixel included in the screen area, and
    wherein the at least one second support member is disposed at a second distance smaller than the first distance.

10. The electronic device of claim 3,
    wherein the support members further include:
        at least one third support member included in the sensor area, and
    wherein the at least one first support member and the at least one third support member are formed of mutually different materials, respectively.

11. The electronic device of claim 10,
    wherein the at least one third support member is formed to be divided into a plurality of parts which have a specified distance between the parts, and wherein the at least one third support member is formed to be disposed in a boundary portion between the sensor area and the screen area.

12. The electronic device of claim 1, wherein the processor is further configured to:
control the display such that the liquid crystal corresponding to the screen area and the liquid crystal corresponding to the sensor area independently operate, and
control the liquid crystal corresponding to the sensor area based on an operation of the sensor module.

13. A display device comprising:
a liquid crystal panel;
a data driver connected with the liquid crystal panel through data lines;
a gate driver connected with the liquid crystal panel through gate lines; and
a timing controller configured to control the liquid crystal panel by applying a data signal to the data driver and applying a gate signal to the gate driver,
wherein the liquid crystal panel includes:
a first area including a color filter,
a second area from which the color filter is absent, the first area surrounding the second area,
a boundary area between the first area and the second area,
a liquid crystal,
a plurality of pixel electrodes,
a first switching device disposed in the first area,
a second switching device disposed in the boundary area, and
support members to maintain a space in which the liquid crystal is disposed, the support members including at least one first support member included in the first area, and at least one second support member included in the boundary area, wherein an arrangement of the at least one first support member is different from an arrangement of the at least one second support member,
wherein at least one pixel electrode included in the second area is disposed differently from pixel electrodes included in the first area, and
wherein a liquid crystal in the second area is driven through the second switching device and the at least one pixel electrode in the second area.

14. The display device of claim 13, wherein the liquid crystal panel comprises:
a first electrode to receive a first voltage;
a second electrode disposed in the first area and configured to receive a second voltage, which forms a specified potential difference from the first voltage, to change a state of a part of the liquid crystal; and
a third electrode disposed in the second area, and configured to receive a third voltage, which forms a specified potential difference from the first voltage, to change a state of another part of the liquid crystal,
wherein the first switching device is connected with the second electrode, and
wherein the second switching device is connected with the third electrode.

15. The display device of claim 14,
wherein the second electrode includes a plurality of second electrodes,
wherein the third electrode includes a plurality of third electrodes,
wherein the first switching device includes a plurality of first switching devices,
wherein the second switching device includes a plurality of second switching devices,
wherein a liquid crystal corresponding to the second area is driven through the plurality of the second switching devices and the plurality of the third electrodes, and
wherein the plurality of the third electrodes are formed in mutually different sizes.

* * * * *